US010945411B2

(12) United States Patent
MacNeil et al.

(10) Patent No.: US 10,945,411 B2
(45) Date of Patent: *Mar. 16, 2021

(54) PET FEEDING SYSTEM

(71) Applicant: MACNEIL IP LLC, Bolingbrook, IL (US)

(72) Inventors: David F. MacNeil, Fort Lauderdale, FL (US); Frederick W. Masanek, Jr., Barrington, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/737,811

(22) PCT Filed: Mar. 23, 2017

(86) PCT No.: PCT/US2017/023873
§ 371 (c)(1),
(2) Date: Dec. 19, 2017

(87) PCT Pub. No.: WO2017/176466
PCT Pub. Date: Oct. 12, 2017

(65) Prior Publication Data
US 2019/0000035 A1 Jan. 3, 2019

Related U.S. Application Data

(63) Continuation of application No. 15/467,160, filed on Mar. 23, 2017, which is a continuation-in-part of
(Continued)

(51) Int. Cl.
*A01K 5/01* (2006.01)
*A01K 7/00* (2006.01)

(52) U.S. Cl.
CPC .......... *A01K 5/0135* (2013.01); *A01K 5/0142* (2013.01); *A01K 7/005* (2013.01)

(58) Field of Classification Search
USPC ........ 119/51.01, 51.5, 61.5–61.57; D30/121, D30/129, 130, 133
See application file for complete search history.

(56) References Cited

U.S. PATENT DOCUMENTS 1,187,899 A * 6/1916 Gardam ................. A47G 19/26
220/23.86
2,543,465 A * 2/1951 Morey ................. A01K 5/0114
119/51.5
(Continued)

FOREIGN PATENT DOCUMENTS

DE 4118066 A1 * 12/1992 ........... A01K 5/0128

OTHER PUBLICATIONS

International Searching Authority, The International Search Report and the Written Opinion of the International Searching Authority, dated Aug. 17, 2017, prepared for International Application No. PCT/US17/23873.
(Continued)

*Primary Examiner* — Andrea M Valenti
(74) *Attorney, Agent, or Firm* — Perkins IP Law Group LLC; Jefferson Perkins

(57) ABSTRACT

A top surface of an elevating stand of a pet feeding system defines bowl receptacles into which respective food and water bowls may be removably installed. A first zone of the top surface of the stand includes an upwardly convex ring that laterally surrounds a respective bowl receptacle. A second zone of the top surface of the stand laterally surrounds the first zone, except as interrupted by a finger notch. Each bowl has a peripheral lip with a lower surface formed as a downwardly concave ring that fits over the upwardly convex ring of the stand. An edge of the bowl rests on the
(Continued)

second zone at a location below the upper limit of the convex ring. A base of the stand cooperates with upstanding ribs in an elastomeric mat to prevent lateral movement of the stand and to prevent rotation of the stand around the stand center.

5 Claims, 13 Drawing Sheets

Related U.S. Application Data application No. 15/089,863, filed on Apr. 4, 2016, now abandoned.

(56) References Cited

U.S. PATENT DOCUMENTS

| | | | |
|---|---|---|---|
| 2,765,640 A * | 10/1956 | Hood, Jr. | A47G 19/2283 220/23.83 |
| 2,799,147 A * | 7/1957 | Crawford, Jr. | A47G 19/2283 220/23.83 |
| 2,813,509 A * | 11/1957 | Bruno | A01K 5/0114 119/51.01 |
| 3,008,600 A * | 11/1961 | Smith | A47G 19/2283 220/23.83 |
| 3,067,904 A * | 12/1962 | Raymond | A47G 19/2283 220/23.83 |
| D229,073 S * | 11/1973 | Brickel | D30/130 |
| 3,949,524 A * | 4/1976 | Mickelson | A01G 9/02 47/79 |
| 4,576,118 A | 3/1986 | Meadow | |
| D284,438 S * | 7/1986 | Levien | D7/584 |
| 4,989,846 A * | 2/1991 | Quinn | A47G 23/06 269/54.5 |
| D362,090 S * | 9/1995 | Baldwin | D30/130 |
| 5,467,738 A | 11/1995 | Cass | |
| 5,560,316 A | 10/1996 | Lillelund et al. | |
| 5,605,247 A | 2/1997 | Earnshaw | |
| 5,641,140 A * | 6/1997 | Sorenson | A47B 13/16 248/205.3 |
| D454,321 S * | 3/2002 | Lu | D12/203 |
| 6,840,191 B2 * | 1/2005 | Gaspary | A01K 5/0128 119/61.5 |
| D623,359 S | 9/2010 | Kim | |
| 7,845,845 B1 * | 12/2010 | Kelly | B01F 13/0818 366/274 |
| D630,512 S * | 1/2011 | Venier | D9/425 |
| D670,450 S | 11/2012 | Graves et al. | |
| 8,752,507 B2 | 6/2014 | Korrie | |
| D716,003 S | 10/2014 | Brown | |
| D724,278 S * | 3/2015 | Avalos Sartorio | D30/130 |
| D727,576 S * | 4/2015 | Avalos Sartorio | D30/121 |
| 9,095,117 B1 | 8/2015 | Kumar | |
| D744,174 S * | 11/2015 | Jones | D30/133 |
| D755,447 S * | 5/2016 | Andrews | D30/129 |
| 9,723,812 B2 * | 8/2017 | Jones | F16M 11/041 |
| D812,433 S * | 3/2018 | Kwok | D7/553.4 |
| 2003/0106498 A1 | 6/2003 | Mersits et al. | |
| 2005/0235919 A1 * | 10/2005 | Willinger | A01K 5/0114 119/61.5 |
| 2009/0241844 A1 | 10/2009 | Becattini, Jr. et al. | |
| 2010/0180827 A1 | 7/2010 | Becattini, Jr. et al. | |
| 2010/0288673 A1 | 11/2010 | Venier | |
| 2011/0253054 A1 | 10/2011 | Hargrove | |
| 2013/0334377 A1 | 12/2013 | Lee | |
| 2017/0086423 A1 * | 3/2017 | Wall | A01K 5/0135 |
| 2017/0280675 A1 * | 10/2017 | MacNeil | A01K 5/0135 |
| 2018/0014505 A1 * | 1/2018 | MacNeil | A01K 7/005 |
| 2018/0242553 A1 * | 8/2018 | Nemeth | A01K 5/0121 |

OTHER PUBLICATIONS

Screenshot of a web site for Principe Di San Daniele SpA, an Italian sliced meat manufacturer, downloaded on Aug. 10, 2020. URL: https://principe.us/product type/pre-sliced/.

* cited by examiner

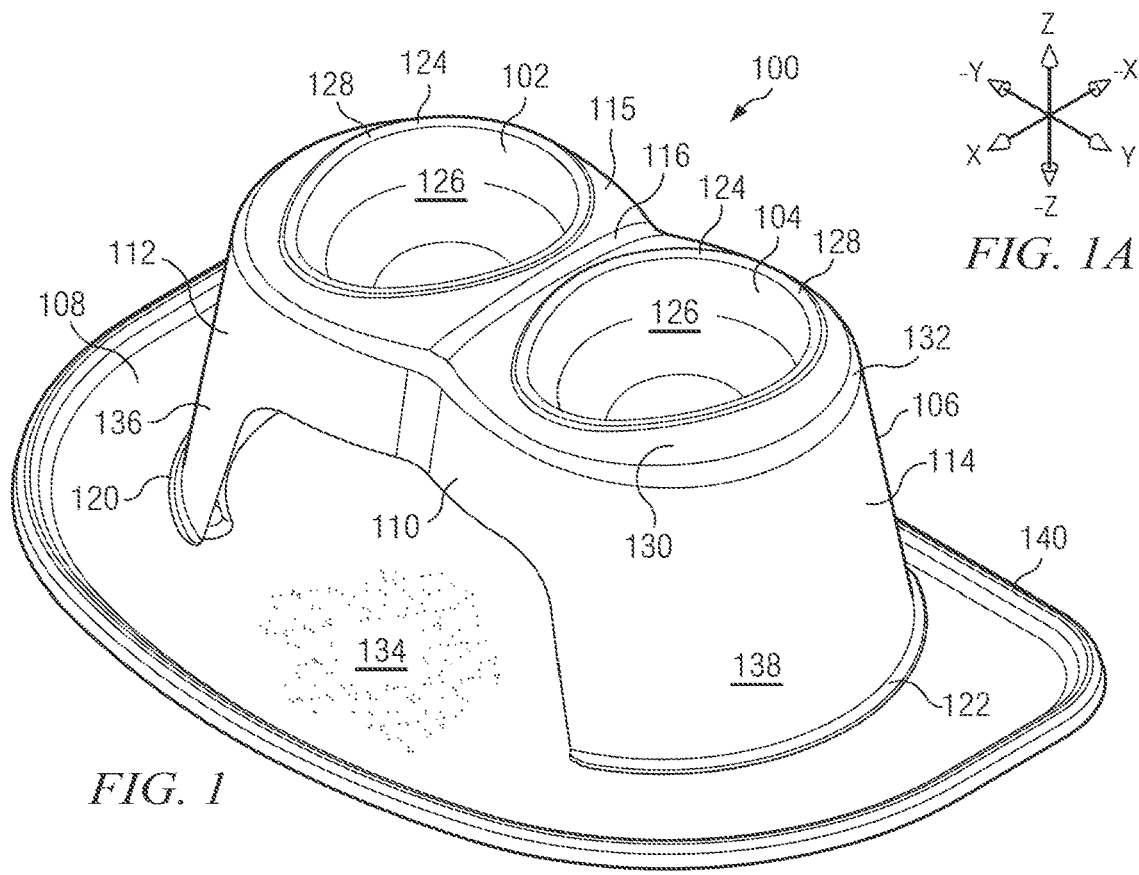
FIG. 1A
FIG. 1
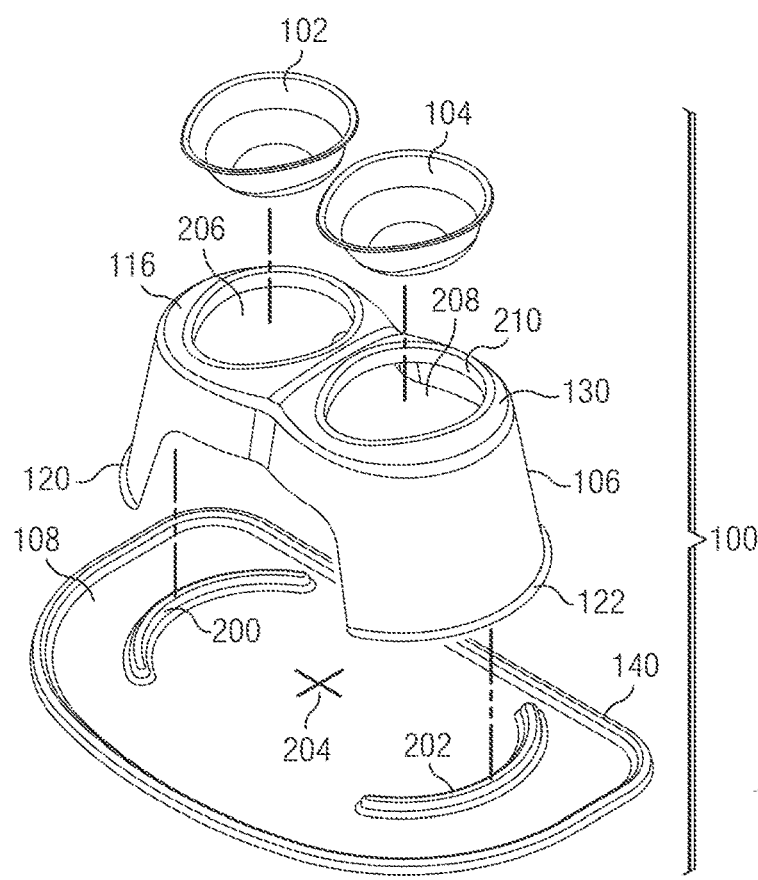
FIG. 2

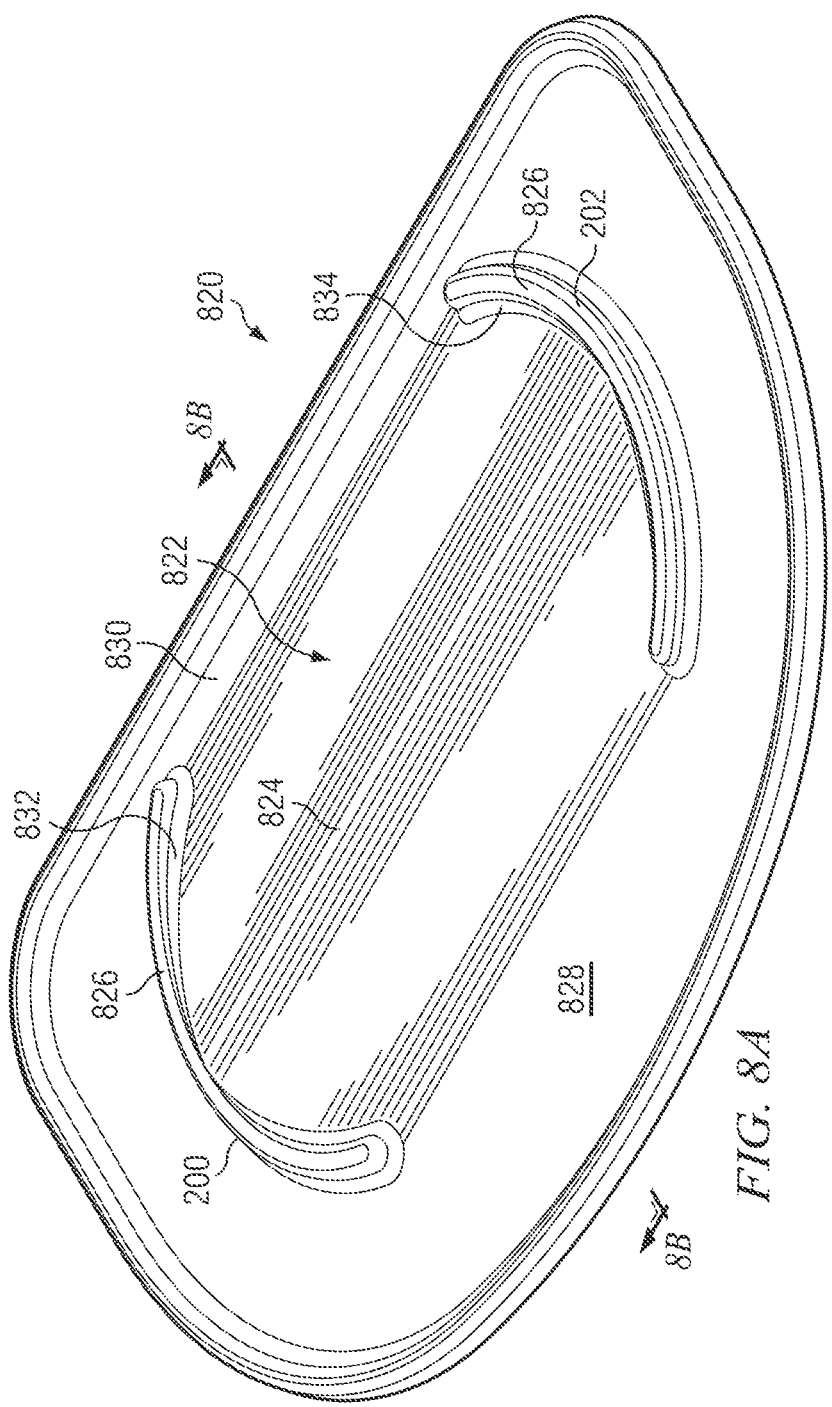
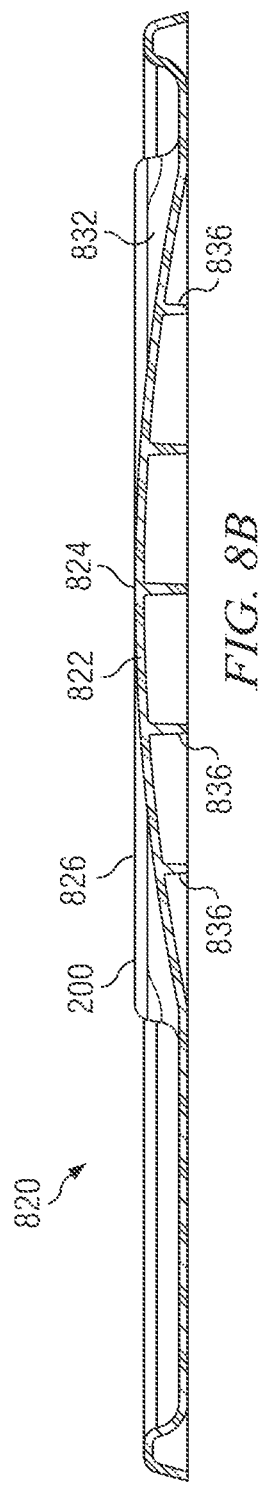

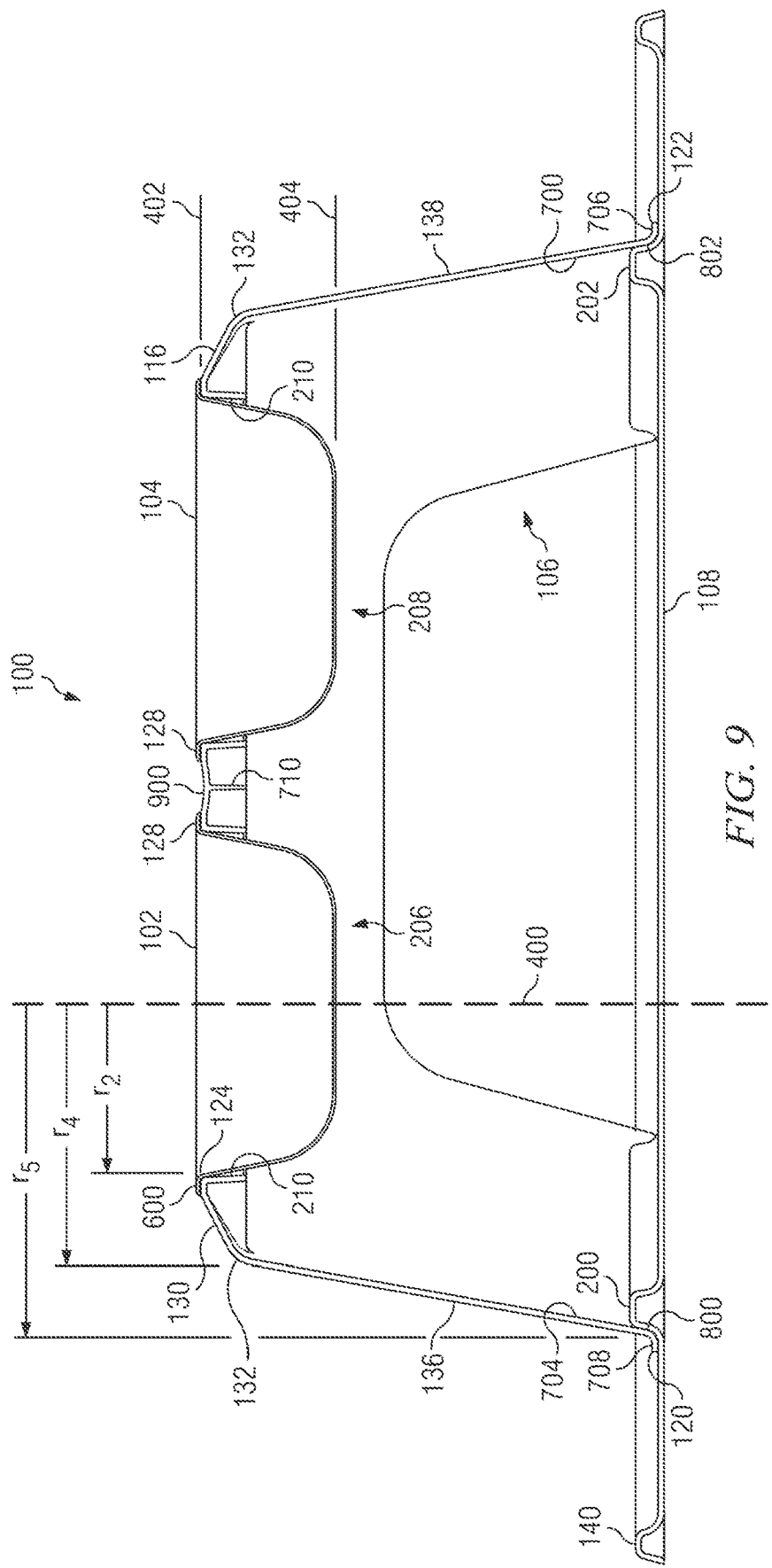

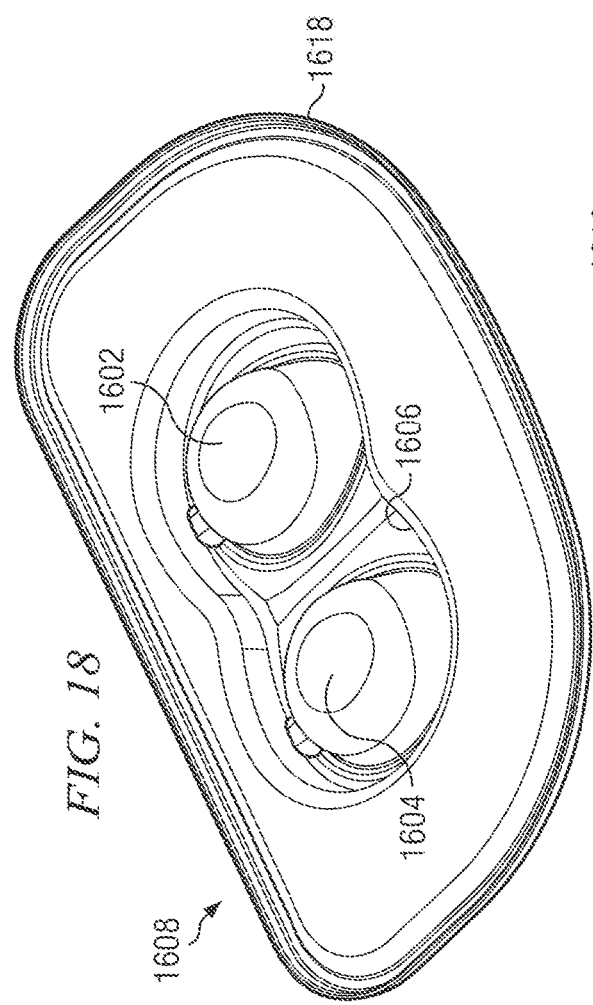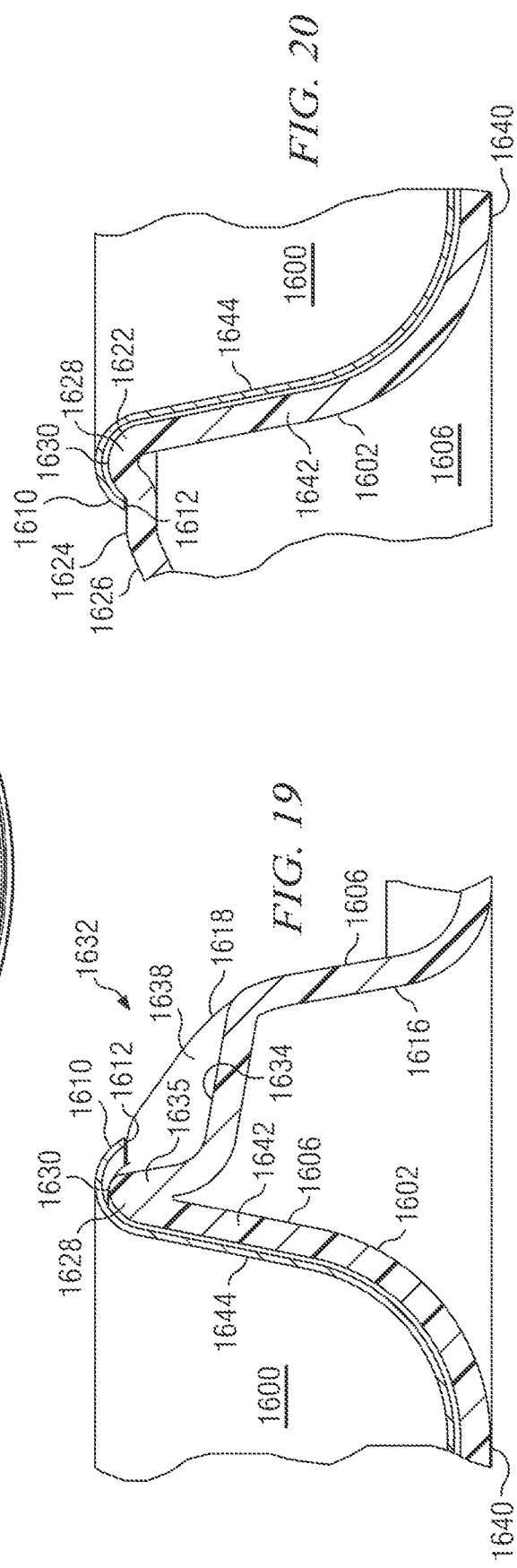

PET FEEDING SYSTEM

BACKGROUND OF THE INVENTION

A traditional way to feed a dog or a cat is to place a bowl of food and a bowl of water on the floor. More recently, pet feeding stations have been developed which elevate the food and water bowls off of the floor. This puts the food and water at a convenient height for the pet.

Dogs in particular can be messy eaters. The optimum pet feeding station or system is one that is easily accessible by the pet, is easy to clean and that generates a minimum of stray food and water. As a cat, or more particularly, a dog, eats, there may be a tendency for the food and water bowl to slide around; these quadrupeds usually do not hold their food or water bowls in place with their paws. A larger dog may be big enough to easily displace its food or water bowl with motions of its head alone. Because they are thus apt to be sources of stray food particles, pet feeding sites equipped with conventional containers sometimes attract unwanted pests.

Dogs in particular have elongated noses and mandibles. A traditional pet bowl has an interior surface that is shaped like a flattened hemisphere, providing a poor match to the shape of a typical dog's head. This makes eating incrementally more difficult for the dog and the mismatch in shape is apt to generate more stray food particles and water splashes. A need therefore exists for a pet feeding system that minimizes awkwardness or discomfort for the pet while at the same time contains and manages the detritus generated by a pet eating its dinner.

SUMMARY OF THE INVENTION

A pet feeding system according to one aspect of the invention has a stand and at least one bowl removably received in a respective bowl opening formed in the top surface of the stand. As so installed, an upper edge of the bowl resides substantially in a horizontal top plane. The bowl is elongated such that a first radius from a vertical bowl axis to the bowl upper edge, drawn in the top plane and toward the front of the stand, is greater than a second radius from that axis to the bowl upper edge, drawn in the top plane and toward the side of the stand.

Preferably, an angle of the bowl interior surface at a front portion thereof, and taken with respect to a vertical reference, is greater than a corresponding angle of the bowl interior surface at a side and/or rear portion thereof. The front elongation of the bowl and the gradualness of the draft of the bowl front section make access to the bowl more comfortable to a feeding pet, particularly a pet with a pronounced nose and mandible such as a dog.

In another aspect of the invention, a pet feeding system has a stand with a top surface that defines at least one bowl opening formed around a vertical axis. A bowl is removably received in the bowl opening. An upper edge of the bowl substantially resides in a top plane orthogonal to the axis. The bowl has a peripheral lip that extends radially outwardly in the top plane from the bowl's upper edge. This lip has a predetermined width. The top surface of the stand consists of two zones: a first zone, immediately surrounding the bowl opening, which has a width that is substantially no more than the bowl lip width, and a second zone, laterally spaced from the bowl opening by the first zone. All of the surface of the second zone is downwardly sloped, so as to better shed stray food and water particles. In embodiments providing first and second bowls, the first zone has a first portion immediately surrounding a first bowl opening and a second portion immediately surrounding a second bowl opening. A width of the second portion is substantially no more than the predetermined bowl lip width. The second, downwardly sloped zone of the top surface separates the first portion of the first zone from the second portion of the first zone.

In a further aspect of the invention, a pet feeding system has a stand with a top surface. First and second spaced-apart bowl openings are formed in the top surface of the stand. Each bowl opening has a curved perimeter. A front-to-back diameter of the opening, drawn at a right angle to an axis of the opening, is greater than a side-to-side diameter of the opening. A bowl is furnished for each bowl opening. Each bowl is adapted to be manually placed in the opening and removed from the opening and has an oblong shape that mates to the curved perimeter of its respective bowl opening.

In another aspect of the invention, a pet feeding system has a stand. A top surface of the stand defines at least first and second spaced-apart bowl openings. A bowl is removably received into each bowl opening. As so received, an upper edge of each of the bowls substantially resides in a horizontal top plane. For each bowl, a first radius, drawn from a vertical bowl axis to the upper edge of the bowl and toward the front of the stand, is greater than a second radius, drawn from the vertical bowl axis to the upper edge of the bowl and toward the side of the stand. In one embodiment, the longest radii of the bowls are parallel to each other. In one embodiment, a draft of a front portion of each bowl is more gradual than a draft of a side portion of each bowl, making pet access to the bowl easier.

In a further aspect of the invention, a pet feeding system includes a stand, at least one bowl, and a mat. A top surface of the stand defines an opening into which the bowl is removably received. Structure in the mat cooperates with structure in the base of the stand to prevent displacement of the stand in any lateral direction, and to prevent rotation around a stand center relative to the mat. In one embodiment, this mat structure is laterally interior to the stand base and includes at least one raised feature, relative to a general upper surface of the mat. The raised feature cooperates with a nonhorizontal surface of the base. In an embodiment, the stand has first and second side walls that extend downwardly from the stand top surface and that each terminate in a foot. The mat has first and second raised features, laterally exterior surfaces of which cooperate with respective interior surfaces of the first and second walls. As assembled, the mat raised features are interior to the stand walls, preferably out of sight and sheltered from food particles and water. In one embodiment, an area of the mat that is forward of the stand is more extensive than is an area of the mat to the rear of the stand, accommodating the front paws of the pet.

In one aspect of the invention, the pet feeding system has enhanced resistance to shear forces that may be exerted (by the pet or otherwise) from the front, rear or sides. The bowl upper edges are inwardly displaced from a shoulder of the stand top surface, and this shoulder is in turn inwardly displaced from the stand base. The inclined front, back and side walls of the stand are braced against front, rear or side impacts.

In yet another aspect of the invention, a pet feeding system has a stand, at least one bowl receptacle formed in the top of the stand, and at least one bowl for removable installation in the bowl. A top surface of the top of the stand has first and second zones. The first zone is disposed to be adjacent the periphery of the bowl receptacle and has an upwardly convex ring that completely laterally surrounds the bowl receptacle. A second zone extends radially outwardly from the first zone and is disposed below an upper limit of the convex ring. A lower surface of a peripheral lip of the bowl is formed as a concave ring that fits over the convex ring of the stand top surface. In an embodiment, an edge of the peripheral lip of the bowl rests on the second zone of the top surface, such that it will be lower than the upper limit of the convex ring.

In one embodiment, a sidewall of the bowl receptacle slopes downwardly and inwardly from the convex ring. The slope of the sidewall varies as a function of the lateral angle around the bowl axis, and can be much more gentle to the front of the bowl receptacle than it is to the rear. A slope of the bowl sidewall varies in the same way, with the slope of the bowl being substantially similar to, but a little steeper than, the slope of the bowl receptacle at any particular horizontal angle around the bowl axis and in any particular horizontal plane.

In an embodiment, a finger notch interrupts the second zone of the stand top surface, but not the upwardly convex ring. A floor of the finger notch is located below the elevation of the second zone of the stand top surface and proceeds inwardly until an inner wall, which is radially inward of a bowl edge when the bowl is installed in the bowl receptacle. The permits the easy removal of the bowl from the bowl receptacle for cleaning and filling.

In another aspect of the invention, a pet feeding system includes a mat and at least one bowl, but doesn't include a stand. Instead, a central pier or mesa is integrally molded with the mat to extend upward from a general and peripheral top surface of the mat. At least one bowl receptacle is formed in the pier top surface. The pier top surface has a first zone with an upwardly convex ring that laterally surrounds the bowl receptacle. A second zone of the pier top surface adjoins the first zone and extends radially outwardly therefrom. The second zone either may be flat or radially outwardly and downwardly sloped. A lower surface of a peripheral lip of the bowl is formed as a downwardly concave ring, so as to fit over the upwardly convex ring on the pier top surface. In one embodiment, a finger notch interrupts the second zone surrounding the bowl receptacle but not the convex ring, and has a floor that is disposed lower than the second zone. This permits the insertion of a finger so as to easily remove the bowl from the pier, as for cleaning and filling. In one embodiment the bowl receptacle is closed so that there is no opening to the bottom surface of the mat.

BRIEF DESCRIPTION OF THE DRAWINGS

Further aspects of the invention and their advantages can be discerned in the following detailed description, in which like characters denote like parts and in which:

FIG. 1 is a top isometric view of a pet feeding system according to the invention, shown in assembled condition;

FIG. 1A is a drawing of a three-dimensional frame of reference used in describing the invention;

FIG. 2 is an exploded isometric view of the pet feeding system introduced in FIG. 1;

FIG. 8A is a top perspective view of an alternative mat for use with the invention;

FIG. 8B is a sectional view taken substantially along line 8B-8B of FIG. 8A;

FIG. 9 is a front sectional view of an assembled pet feeding system;

FIG. 15A is a longitudinal sectional view taken substantially along line 15A-15A of FIG. 15;

FIG. 15B is a transverse sectional view taken substantially along line 15B-15B of FIG. 15;

FIG. 18 is a bottom perspective view of a mat used in the pet feeding system shown in FIGS. 16 and 17;

FIG. 19 is a longitudinal sectional detail taken substantially along line 19-19 of FIG. 16; and FIG. 20 is a transverse sectional detail taken substantially along line 20-20 of FIG. 16.

DETAILED DESCRIPTION

Figure 3:
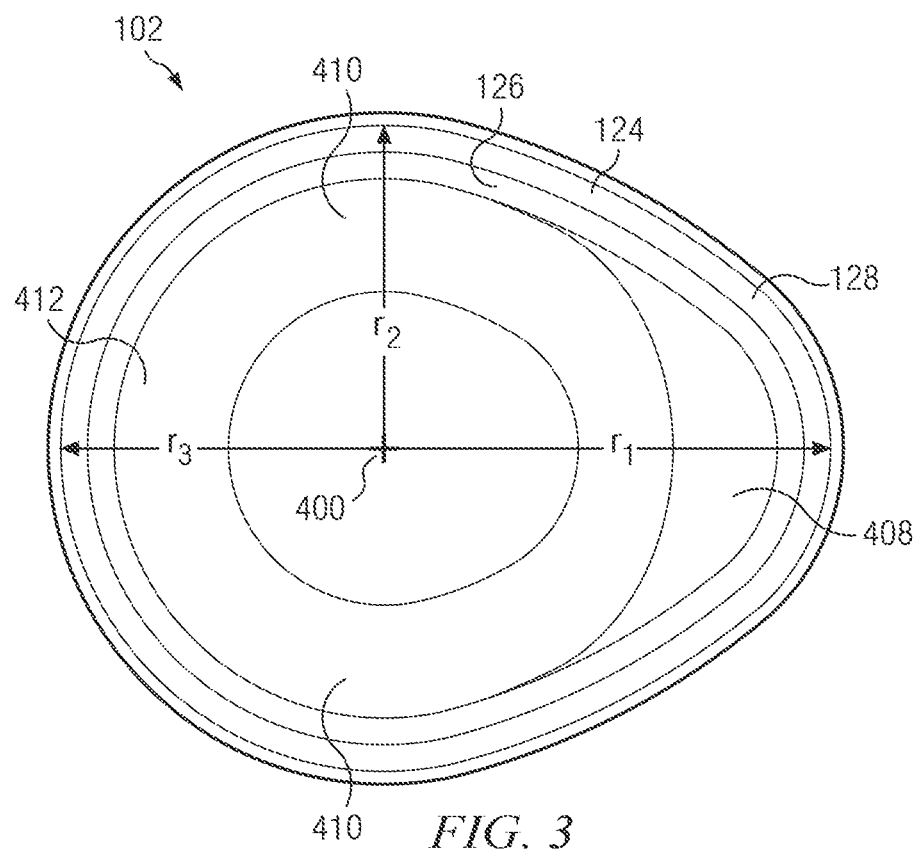
FIG. 3 is a top view of a bowl for use with the invention.

A pet feeding system is generally indicated by 100 in FIG. 1. In this illustrated embodiment, the feeding system 100 has four components: first and second bowls 102 and 104, a stand 106, and a mat 108. In other embodiments, there may be only one such bowl or there could be more than two bowls.

The stand 106 has a front 110 that is joined by a continuous curved wall to a left side 112 and by a continuous curved wall to a right side 114. Front 110 is concavely curved at its center. A top 115 is integrally molded with, and spans across, the front 110, left side 112 and right side 114. The stand top 115 has a stand top surface 116. The stand 106 further has a back or a rear side 118, shown for example in FIG. 7, to which the left and right sides 112, 114 are joined by respective continuous curved walls. The left side 112 and the right side 114 downwardly extend from the top 115 respectively to a left base 120 and a right base 122. In the illustrated embodiment, bases 120 and 122 are distinct and are spaced from each other in a "y", transverse or width direction (see FIG. 1A). In other embodiments, the bases 120, 122 may be continuous with each other and form a single base with an unbroken circumference, or may divided further, for example to create two distinct left legs and two distinct right legs (not shown).

Bowls 102, 104 may be stamped from stainless steel and in one embodiment may be polished. More particularly, bowls 102, 104 may be stamped from 300-series stainless steel, such as Type 301 or Type 304, and even more particularly may be stamped from Type 304 stainless steel, used for containers and implements for food for human consumption. Bowls 102, 104 are thus easy to keep clean and won't harbor microbial contamination. Each bowl 102, 104 has an upper edge 124 and, downwardly and inwardly extending therefrom, an interior surface 126. Each bowl 102, 104 further has a laterally extending lip 128 that, as received in the stand 106, will substantially reside in a horizontal or xy plane.

FIG. 1A depicts a frame of reference used in this specification. Direction x is toward the front of the stand 106, while −x is toward the rear of the stand. Direction y is at 90 degrees to direction x and is toward the right side of the stand 106, while direction −y is toward the left side. Direction z, at ninety degrees to both directions x and y, is an upward vertical direction, while direction −z is vertically downward. An xy plane is horizontal, while xz and yz planes are vertical. The (x, −x) axis is longitudinal or front-to-rear, the (y, −y) axis is transverse or side-to-side, and the (z, −z) axis is vertical.

The stand 106 is preferably integrally injection molded of a tough thermoplastic polymer compound such as polypropylene or ABS and may have a textured exterior surface. The compound used to injection-mold stand 106 may include silver-based antimicrobial particles. Stand 106 may be molded in any of a range of colors. A zone 130 of the top surface 116 extends from the perimeter of the bowl lips 128 to a shoulder 132, at which point the top surface has curved transitions to exterior surfaces of the front 110, left side 112, right side 114 and back 118 of the stand 106. The zone 130 is downwardly sloped relative to the horizontal or xy plane, so that zone 130 will readily shed food particles and fluids onto a general top surface 134 of the mat 108. Peripheral zone 130 occupies all of the top surface 116 that is laterally exterior to the bowl lips 128, so that all of the open area of the top surface 116 will be sloped and will cascade food and water to the mat.

Figure 10:
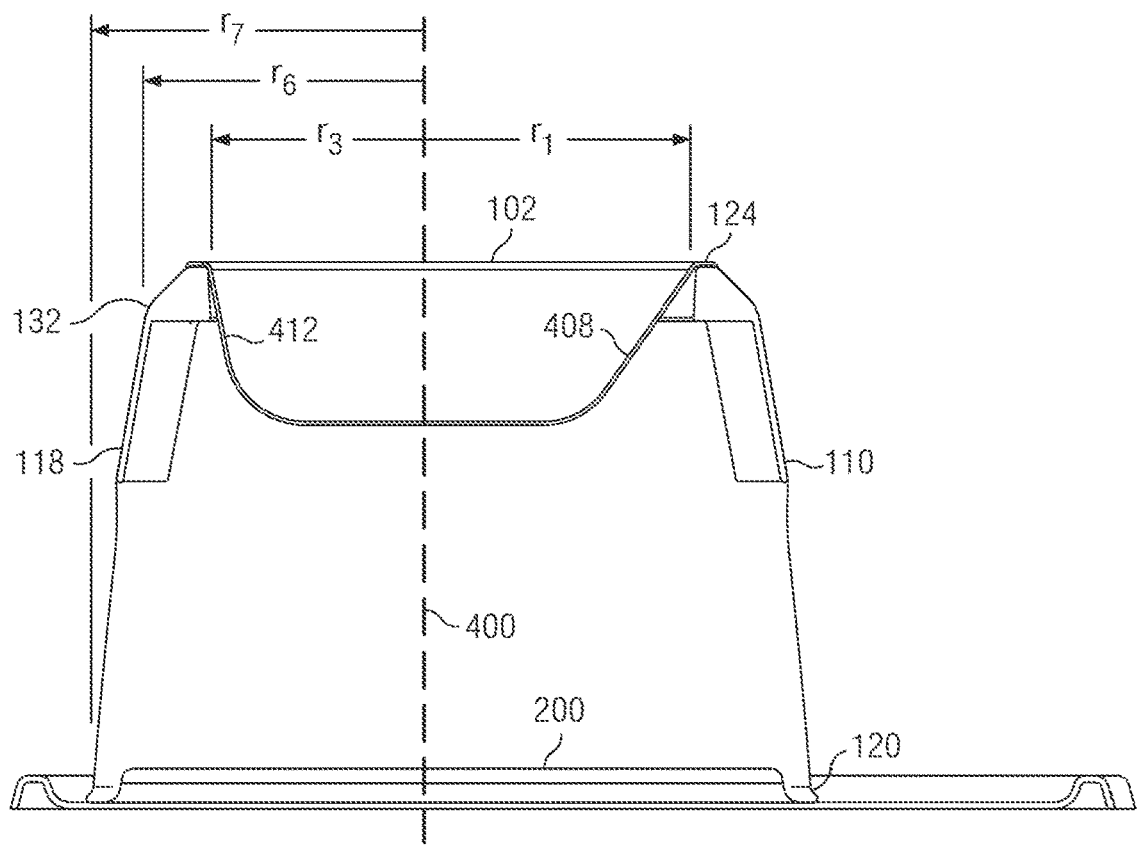
FIG. 10 is a side sectional view of an assembled pet feeding system.

The left base 120 and right base 122 define an area between them that is considerably smaller than the area of the general top surface 134 of the mat 108. The shoulder 132 of the stand top surface 116 is laterally interiorly spaced from the positions of the left and right bases 120, 122. A wall 136 forming the left side 112 slopes downwardly and outwardly until it terminates in base 120, and a wall 138 forming the right side 114 slopes downwardly and outwardly until it terminates in base 122. Walls making up front 110 and rear 118 are likewise sloped downwardly and outwardly from top surface shoulder 132. This provides greater lateral stability and better resistance against lateral forces placed on stand 106 by the pet, as will be further described in conjunction with FIGS. 9 and 10 below.

The mat 108 may be injection-molded, preferably from a thermoplastic elastomer compound. As molded, the mat 108 may have a Shore A hardness in the range of 60 to 85. The mat 108 may be manufactured with an antimicrobial additive (such as ionic or particulate silver that is nontoxic to mammals) that will inhibit the growth of mold, fungus, algae or bacteria that otherwise could stain or cause odors. As an alternative to injection molding and in one embodiment, mat 108 could be thermoformed from a sheet of material having a substantially uniform thickness. Mat 108 may be molded in any of a range of colors. The mat 108 has a raised peripheral margin 140 that works to retain food particles and fluids.

The exploded view of FIG. 2 reveals structure on mat 108 that cooperates with the left and right bases 120, 122 to resist movement of the stand 106 on the mat 108 in any lateral direction. In the illustrated embodiment, this structure consists of a pair of raised features 200 and 202, which more specifically are ribs that are formed as a pair of arcs that are concave relative to a center 204 of the mat 108. Each bowl 102, 104 is received in a respective bowl opening 206, 208 defined in the stand top surface 116. Each bowl opening 206, 208 has a curved perimeter and a front-to-back diameter, as drawn at a right angle to the bowl opening axis, that is greater than a side-to-side diameter drawn at a right angle to that axis. The bowl openings 206, 208 may each be defined by a wall 210 that downwardly depends from the stand top surface 116. The bowls 102, 104 have shapes that mate with bowl openings 206, 208 and may be easily removed by hand for cleaning or filling and manually reinstalled in openings 206, 208. Likewise, the stand 106 may be easily lifted off of mat 108 for cleaning and then located back onto mat 108 with the aid of arcuate locating ribs 200, 202.

Figure 4:
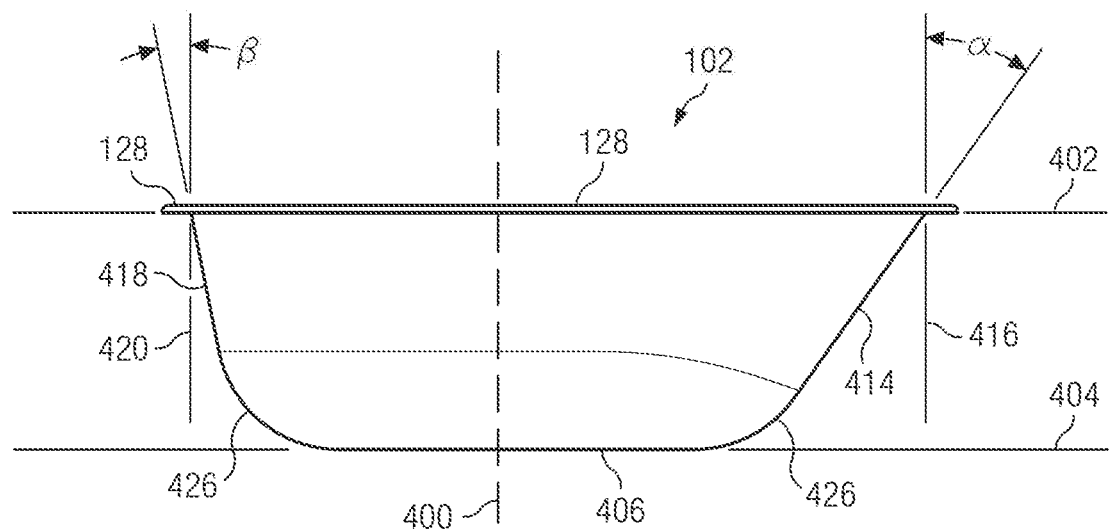
FIG. 4 is a side view of the bowl shown in FIG. 3.

Details of a representative bowl 102 are shown in FIGS. 3 and 4. The bowl 102 is disposed around a bowl axis 400 that is aligned in the vertical or z direction. The bowl 102, as installed in the stand 106, will extend between a horizontal or top plane 402 and a bowl bottom plane 404. A radius $r_1$ from bowl axis 400 to upper edge 124, in an x direction, will be considerably greater than a radius $r_2$ from bowl axis 400 to upper edge 124 in a y direction. Radius $r_1$ will also be significantly greater than a radius $r_3$ drawn from bowl axis 400 in a (−x) direction to the rear of the stand, as shown. Radii $r_1$, $r_2$ and $r_3$ are all drawn in xy plane 402. The bowl 102 basically is lobed toward its front. Radius $r_1$ gradually decreases to radius $r_2$ as a function of angular displacement away from the x direction. Radii $r_2$ and $r_3$ may be substantially similar.

Figure 6:
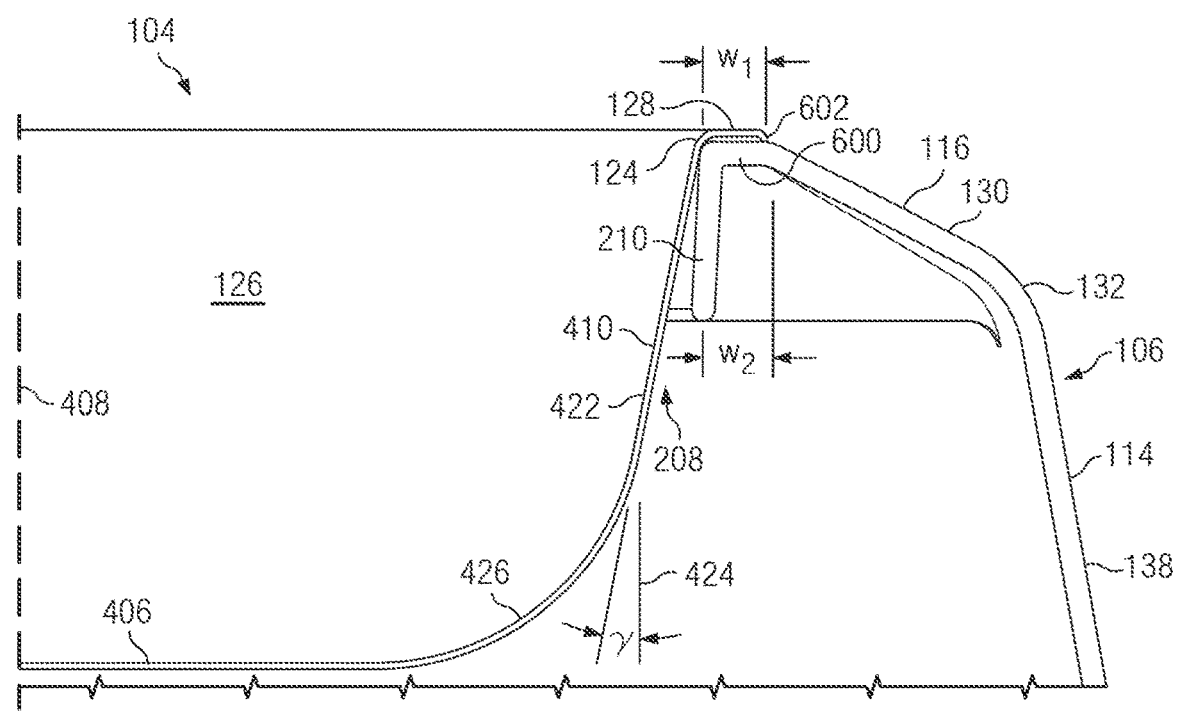
FIG. 6 is a side elevational detail of a bowl as installed in a bowl opening of a stand.

One shape of each of bowls 102, 104 may be arrived at as follows. FIG. 6B is a schematic plan view of a periphery 606 of a bowl 102, as it appears at top plane 402. At top plane 402, the bowl periphery 606 may be a composite of three sets of curves: a circular segment 608 that is disposed at a radius $S_1$ from the bowl axis 400; a circular segment 610 that is drawn around a second center 612, and at a radius $S_2$ therefrom; and two circular segments 614, 616 that each connect an end of circular segment 608 to a respective end of circular segment 610. Segments 614 and 616 each have a radius $S_3$ around respective third centers that do not appear in FIG. 6B. Radius $S_1$ may be chosen to be twice radius $S_2$. Radius $S_3$ may be chosen to be twice radius $S_1$. Bulge B, being the displacement of a frontmost point 618 of periphery 606 from the end of radius $S_1$ along the X axis, may be chosen as $0.4S_1$.

The bottom 406 of the bowl is initially drawn as a circle (not shown) around bowl axis 400, at a radius that is smaller than $S_1$. The sides of the bowl are then lofted from periphery 606 to the bottom bowl circle. The bowl shaped is then radiused at a constant radius at its bottom to produce the curved transitions 426 and the shape that is seen in FIGS. 4 and 6.

As installed in the bowl openings 206, 208, in the illustrated embodiment the longest radii ($r_1$) of bowls 102, 104 will be parallel to each other and to the x direction.

A bottom 406 of the bowl 102 may be flat, as shown, to aid in stability while filling. A front portion 408 of the curved interior surface 126 has a more gradual draft than does a side portion 410 or a rear portion 412. In the illustrated embodiment, an xz section of the front portion 408, as including the bowl axis 400, includes a straight segment 414. This straight segment 414 makes an angle α with respect to a vertical reference 416. An xz section of the rear portion 412, as including the bowl axis 408, includes a straight segment 418. Straight segment 418 makes an angle β with a vertical reference 420, with α>β. Turning momentarily to FIG. 6, a yz section of the side portion 410, as including the bowl axis 408, includes a straight segment 422. Straight segment 422 may make an angle γ with a vertical reference 424, with α>γ. Angles β and γ may be similar to each other. Straight segments 416, 418, 422, and the curved surfaces of which they are a part, may be joined to the bottom 406 by curved transitions 426. In alternative embodiments, one or more of the straight segments 416, 418 or 422 may be replaced by curves. Nonetheless, as taken in any particular horizontal plane, the slope of the front portion 408 will remain gentler than will the slopes of the side portions 410 or rear portion 412.

Figure 5:
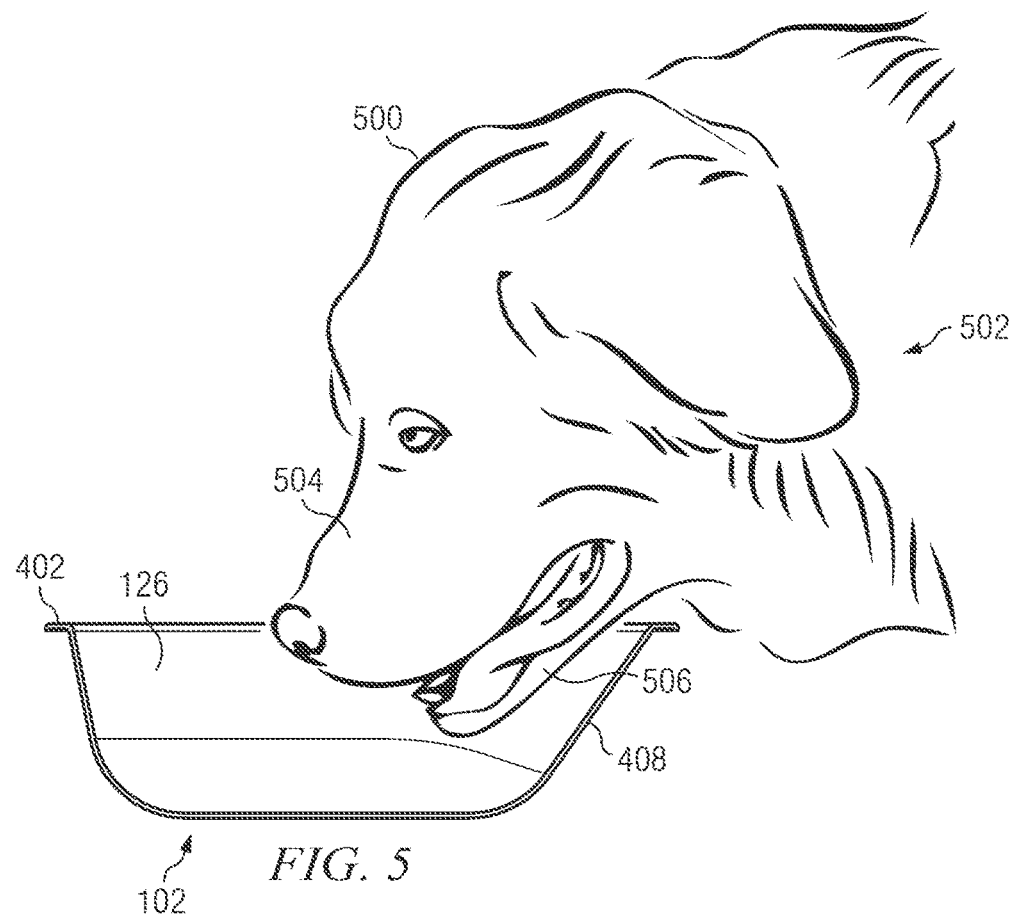
FIG. 5 is a schematic side view of the bowl shown in FIGS. 3 and 4, showing the relationship of the bowl interior surface to the nose and jaw of a feeding dog.

FIG. 5 depicts the relationship of a representative bowl 102, here shown in an xz sectional view, and the head 500 of a dog 502. Dog 502, as is typical of most breeds, has a pronounced nose 504 and jaw 506. When dog 502 wants to eat or drink from bowl 102, it will insert its jaw 506 and nose 504 into the bowl 102. The gradual draft of the front portion 408 of the bowl interior surface 126 makes this easy for the dog to do. And because a good portion of the dog's nose 504 and jaw 506 are below bowl top plane 402, the escape of food particles and water out of bowl 102 is reduced.

Another technical advantage of the invention derives from the provision of noncircular bowls 102, 104 for removable installation into respective noncircular openings or receptacles 206, 208 in stand 106. Dogs in particular make extensive use of their tongues while feeding and little or no use of their paws. A dog often will lick the internal surface of the bowl 102, 104, often imparting a considerable amount of force to the bowl. If bowls 102, 104 and openings 206, 208 were circular, the licking action of the dog would cause the bowl to spin within the bowl receptacle, having a tendency to eject food and water particles and also tending to encourage the inadvertent separation of the bowl from the stand 106. The noncircularity of the bowls 102, 104 and their bowl receptacles 206, 208 prevents this, and keeps the extended front lobe of each bowl 102, 104 oriented toward the front of the stand 106 and toward the pet.

FIG. 6 is a yz sectional detail of right bowl 104 as it is received into right bowl opening 208 of stand 106. As mentioned before, the top surface 116 of the stand 106 has two zones: a peripheral zone 130, and an annular zone 600 that immediately surrounds each bowl opening 206, 208. The annular zone 600 can be flat and has a width $w_2$. The bowl lip 128 has a width $w_1$. The bowl lip 128 extends laterally from the bowl upper edge 124. The exterior surface of bowl upper edge 124 is (in this view) to the left or laterally interior of the inner surface of bowl opening wall 210, by an intentional gap that will ensure that the bowl can be easily inserted into and taken out of the bowl opening 208. The inner end of lip 128 is therefore slightly laterally interior of an inner end of the zone 600. On the other hand, it is important that a turned-down finishing lip 602 of the preferably metal bowl 104 land on zone 600 rather than on sloped zone 130. Therefore, the difference between zone width $w_2$ and lip width $w_1$ should be a manufacturing tolerance minus a bowl/opening fitting gap. The widths $w_2$ and $w_1$ will be substantially similar to each other, and in one embodiment could be identical. This will minimize the exposure of annular zone 600 to stray food particles or fluids, most or all of which will then be received by sloped zone 130 of the top surface 116, and from there cascade to mat 108.

In the illustrated embodiment, the peripheral zone 130 is shown to be flat until it transitions, at shoulder 132, to a right sidewall 138 of the side 114. The peripheral zone 130 could take on a more convex shape, so long as every point on it is downwardly and outwardly sloped to optimally shed stray food and water.

Figure 6A:
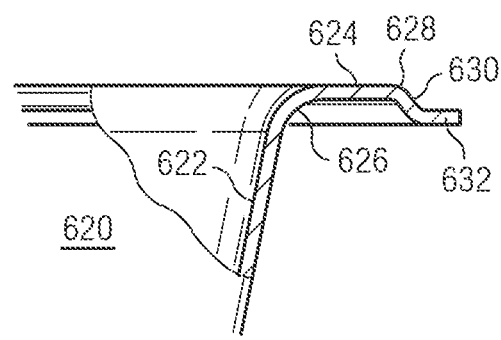
FIG. 6A is a side elevational detail of an alternative bowl according to the invention.
Figure 6B:
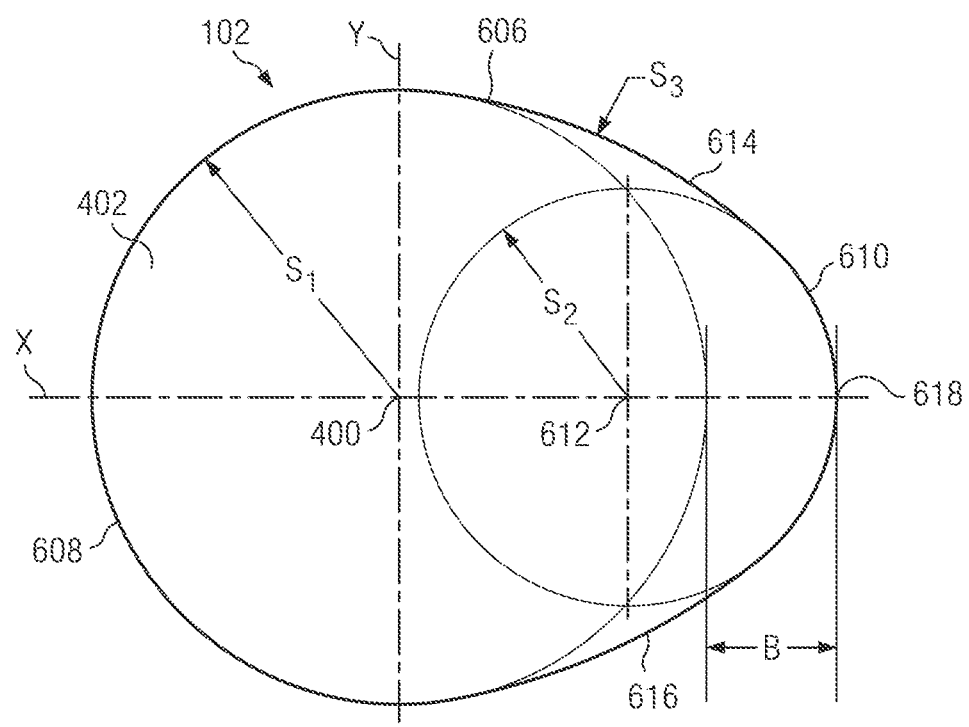
FIG. 6B is a schematic view of a bowl periphery taken in a top plane thereof, to show a possible bowl geometry.

FIG. 6A is a yz sectional detail of an alternative bowl 620. Bowl 620 is manufactured from the same materials as those described for bowl 102. Bowl 620 has a curved sidewall 622 that is straight in this section. Sidewall 622 is joined at its upper end to a horizontally outwardly extending annular portion 624, by means of a curved transition 626. At its horizontally outer end 628, annular portion is joined to a downwardly sloped portion 630 that in turn is joined to an outer, horizontally disposed annular lip 632. Lip 632 will land on zone 600 of the stand 106. Finishing the edge of bowl 620 in this fashion makes for a bowl that is easier to clean and is less likely to harbor bacteria-bearing food particles or fluids.

Figure 7:
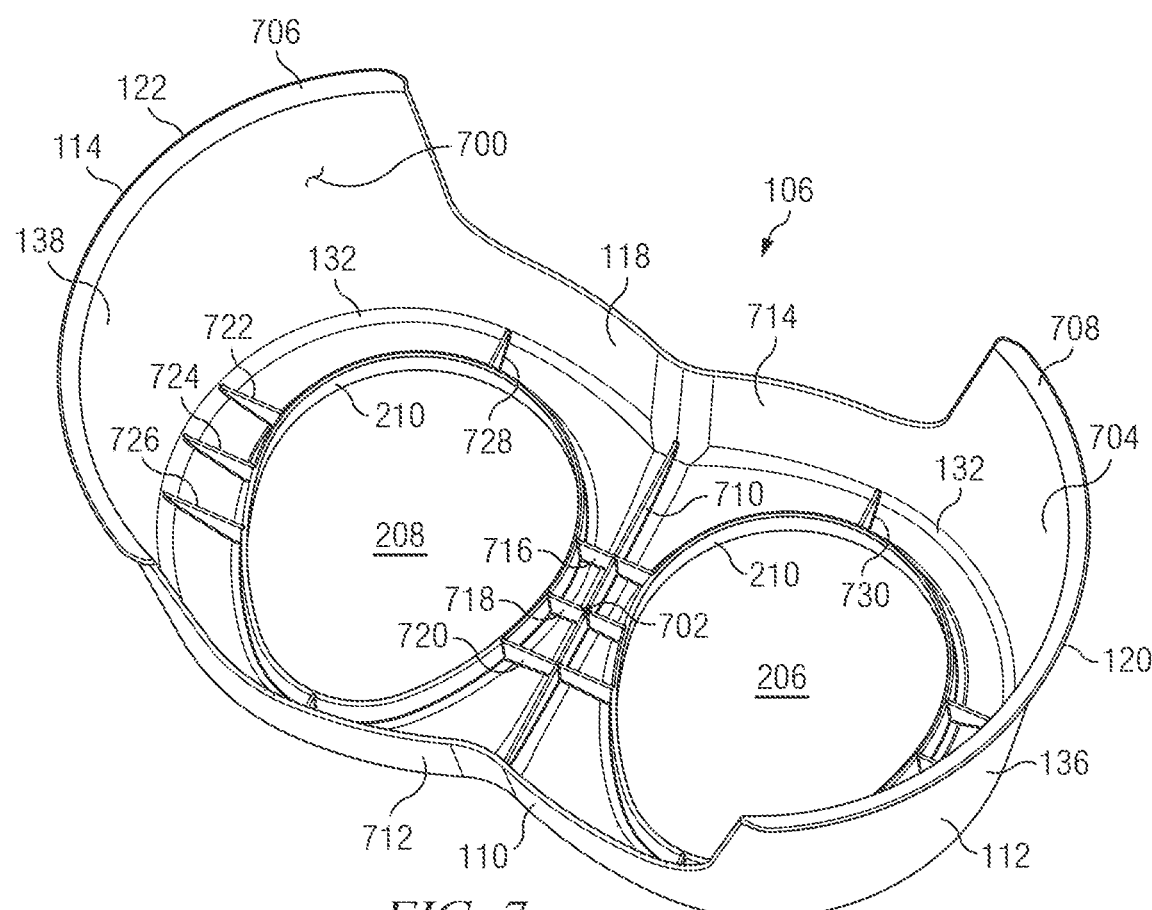
FIG. 7 is a bottom isometric view of a stand for use with the invention.

FIG. 7 shows the underside of stand 106. In the illustrated embodiment, right wall 138 downwardly and outwardly extends from top shoulder 132 and can be a curved sheet. At least the bottom portion of the interior of right wall 138 is formed as a concavely arcuate surface 700 that faces a center 702 of the stand 106. However, the radius of arc of the surface 700 is substantially less than its distance to center 702. Similarly, the left side wall 136 includes, at least at its lower end, a concavely arcuate surface 704. The radius of arc of the surface 704 is substantially less than its distance to center 702. In the illustrated embodiment, surfaces 700, 704 are conical rather than cylindrical sections and widen as they extend downwardly from top surface shoulder 132. Curved walls 136, 138 will exhibit greater rigidity than planar walls (not shown) at the same locations.

Right wall 138 terminates in a right base or foot 122 that may be formed as a horizontally outwardly extending flange 706. Left wall 136 terminates in a left base or foot 120 that may be formed as a horizontally and outwardly extending flange 708.

The underside of stand 106 is not seen in normal use and is less likely to acquire food or water particles. It is therefore a good site for reinforcing ribs to stiffen the structure. In the illustrated embodiment, these include a center rib 710, disposed in an xz plane and on center 702 that extends from a front wall 712 to a rear wall 714. Three spaced-apart transverse ribs 716, 718 and 720, in yz planes, intersect rib 710 and connect to bowl opening walls 210 on both of their ends. A set of three yz stiffening gussets 722, 724 and 726 connect bowl opening wall 210 of opening 208 to right wall 138; a similar set of stiffening gussets (not all shown) are disposed between the bowl opening wall 210 of opening 206 and left wall 136. A triangular xz gusset 728 may connect wall 210 of opening 208 to back wall 714, and a similar gusset 730 may connect wall 210 of opening 206 to back wall 714. Similar gussets may connect the wall 210 of openings 208, 206 to front wall 712.

Figure 8:
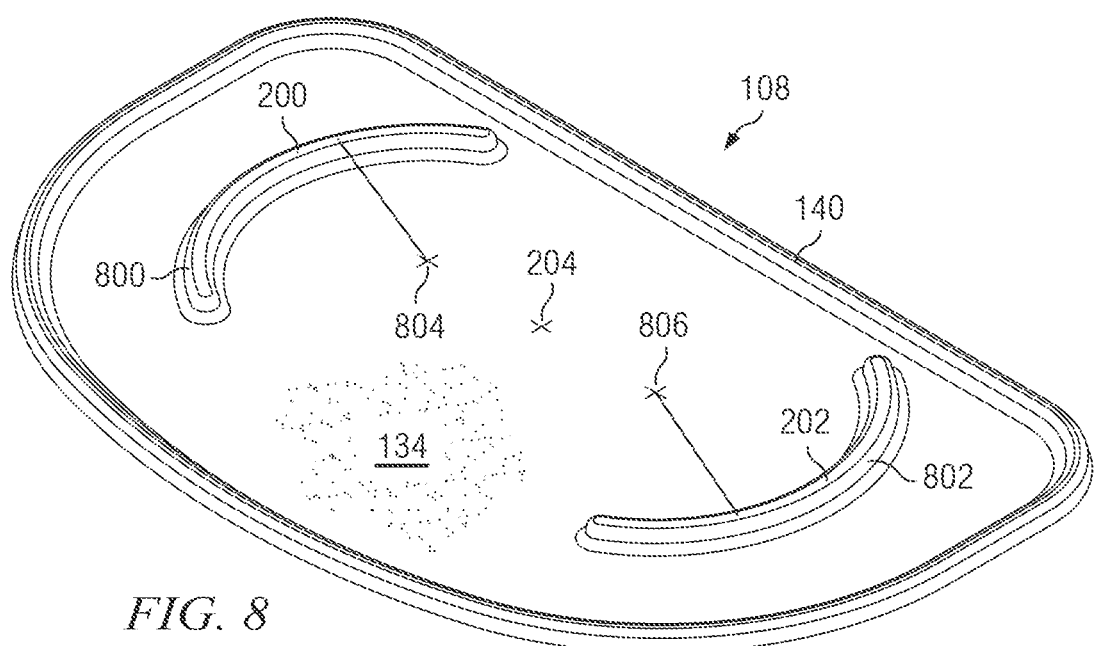
FIG. 8 is a top perspective view of a mat for use with the invention.

An area mat 108 for use with the invention is shown in FIG. 8. In the illustrated embodiment, each locating feature or rib 200, 202 is upstanding from general upper mat surface 134 and is formed as an arc. Each rib 200, 202 has an exterior frustoconical surface 800, 802 that is meant to mate with a respective one of internal surfaces 704, 700 of left and right stand walls 136, 138. Surface 800 is at least roughly a surface of rotation around a vertical axis going through point 804. Surface 802 is at least roughly a surface of rotation around a vertical axis going through point 806. Points 804 and 806 are considerably displaced, in a y or −y direction, from mat center 204. This insures that the ribs 200, 202 will prevent the rotation of stand 106 around its vertical center 702 relative to mat 108.

Ribs 200, 202 thus are raised features that cooperate with nonhorizontal surfaces of stand bases 120, 122 to prevent movement of the stand 106 in any lateral direction; a vector component of at least one of arcuate surfaces 800, 802 will resist movement in x, −x, y or −y directions or a direction which is any combination thereof. Structure alternative to that shown could do the same job. For example, instead of independent ribs 200, 202, mat 108 could have a mesa that stretches between them but that still has lateral exterior arcuate surfaces 800, 802. The ribs 200, 202 could be of shapes other than arcs, which then would cooperate with internal wall surfaces 700, 704 that would have complementary shapes. It is also possible to break up each rib 200, 202 into spaced-apart segments or individual columns.

One advantage of ribs 200, 202 as they appear in the illustrated embodiment is that it is easy to clean them and the area in between them. Another advantage is that, once the stand walls 136, 138 have been lowered in place on top of them, they will not be easily visible (they are short enough, as seen in FIGS. 1 and 8, to be screened from view by walls 136, 138 from the front or back, or even at a considerable angle from the front or back), and will be sheltered from falling food particles and fluid. For similar reasons, it is preferred to have the mat cooperating structure 200, 202 laterally interior to the stand walls 136, 138 instead of laterally exterior to them. In the illustrated embodiment, side walls 136 and 138, and their curved transitions to front and back walls 712 and 714, subtend arcs that are enough larger than the arcs of ribs 200, 202 that the latter can be seen only with difficulty once system 100 is assembled.

In a preferred embodiment, the arc subtended by rib exterior surface 800 should be only slightly less than the arc subtended by inner wall surface 700. This insures maximum contact for support, but also minimizes gaps that could cause food particle trapping. A smaller arc for rib 800 would create more of a gap between wall inner surface 700 and the general top surface of mat 108, where food may trap. The arc of rib exterior surface 802 likewise should be only slightly shorter than the arc of inner wall surface 704.

An alternative embodiment of a mat 820 for use with the invention is shown in FIGS. 8A and 8B. Mat 820 in general is similar to mat 108, and is made from materials similar to those described for mat 108, but instead of the area between ribs 200, 202 being flat, an area 822 is vaulted or barrel-shaped, with an axis of the "barrel" being in a y direction. A top 824 of the vault 822 can be at the same height as the top 826 of ribs 200, 202. In operation, when fluid or particulate matter drops on vaulted surface 822, it will tend to flow or roll downhill and out onto peripheral areas 828, 830. Providing the vaulted surface 822 also decreases the surface area of internal facing surfaces 832, 834 of ribs 200, 202. That decreases the amount of surface that can accumulate bacteria and the like and decreases the amount of surface that needs to be cleaned. As shown in FIG. 8B, vaulted surface 822 may be supported with a plurality of ribs 836 that downwardly extend from surface or panel 822 and are supported by the floor.

The assembled pet feeding system in a yz elevational section is seen in FIG. 9. The interior surface 704 of left leg 136 fits to external surface 800 of rib 200. The interior surface 700 of right leg 138 fits to external surface 802 of rib 202. Foot flanges 706, 708 provide more lateral support and sectional rigidity. As thermoformed from a sheet of uniform thickness, or as injection molded so that all walls are close to a nominal design thickness, the ribs 200, 202 can be hollow.

The bottoms of bowls 102, 104 reside in a bottom plane 404 that, in this embodiment, is elevated by a considerable distance above the mat 108. Pet feeding systems 100 can be made in various sizes, in which the size of the food and water bowls 102, 104, and their height from the mat 108, can be individually altered.

The illustrated embodiment includes two spaced-apart bowls 102, 104. The peripheral zone 130 of the top surface 116 includes a concave valley 900 in between the lips 128 of the bowls 102, 104. The bottom of this valley 900 is itself sloped in an x and in a −x direction from a central point, providing sloped paths for stray food particles and water to cascade downward and off of stand 106. In multiple-bowl embodiments, all portions of the third zone of the stand surface are downwardly and outwardly sloped relative to the nearest bowl axis 400.

The stand 106 is outwardly splayed in x, −x and y, −y directions to give it greater stability and resistance against lateral forces. A radius $r_4$ from axis 400 of bowl 102 to the top surface shoulder 132 is greater than bowl radius $r_2$. A radius $r_5$ from axis 400 to base 120, and in the −y direction, is greater than radius $r_4$. The mass of the preferably stainless steel bowl 102 and its contents will be well inward from left wall 136. Similar relationships obtain for bowl 104. Inclined walls 136, 138 are braced to withstand shear forces in the yz plane. In the xz plane shown in FIG. 10, a radius $r_6$ from axis 400 to the top surface shoulder 132 is greater than either bowl radii $r_1$ or $r_3$. A radius $r_7$ from axis 400 to base 120 is greater than radius $r_6$. The mass of bowl 102 is well inward from either the back 118 or the front 110 of the stand 106. Similar relationships exist for bowl 104. The inclined back and front 118, 110 of the stand 106 are braced to withstand shear forces in the xz plane.

Figure 11:
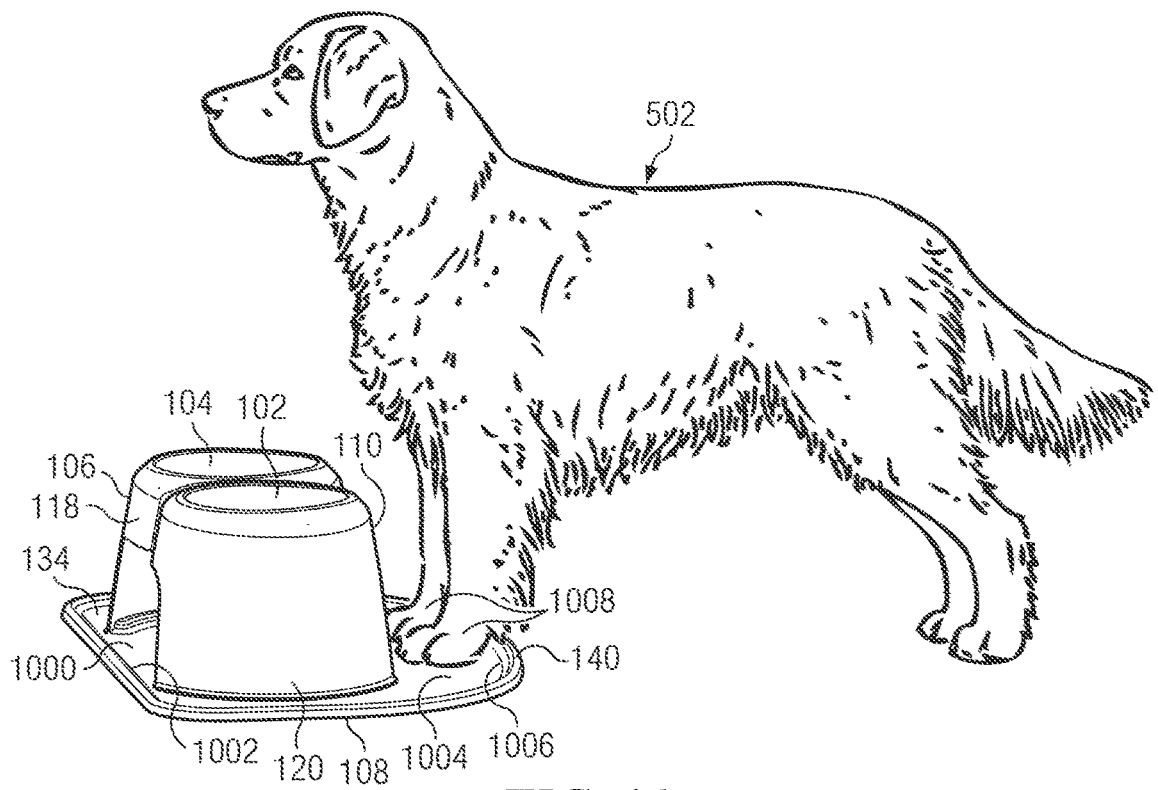
FIG. 11 is a top perspective view of a pet feeding system according to the invention, showing its spatial relationship to a feeding pet.

As best seen in FIG. 11, a total area of the mat 108 is much larger than an area taken up by or located between the stand bases 120 and 122. The stand 106 is sited well to the back of the center of mat 108. A rear region or area 1000 of mat 108 extends rearwardly from the back 118 of the stand 106 to a rear margin 1002 of mat 106. Margin 1002 can be straight for placement against a wall. A front region or area 1004 of mat 108 extends forwardly from the front 110 of the stand 106 to a front margin 1006 of the mat 108. Front margin 1006 can be convexly curved. Regions 1000, 1004 are extensive enough to catch most stray food and water. But front region 1004 is considerably larger than region 1000, so that it can accommodate the front paws 1008 of a feeding pet 502. The convexly curved shape of margin 1006 also helps in this regard.

Figure 12A:
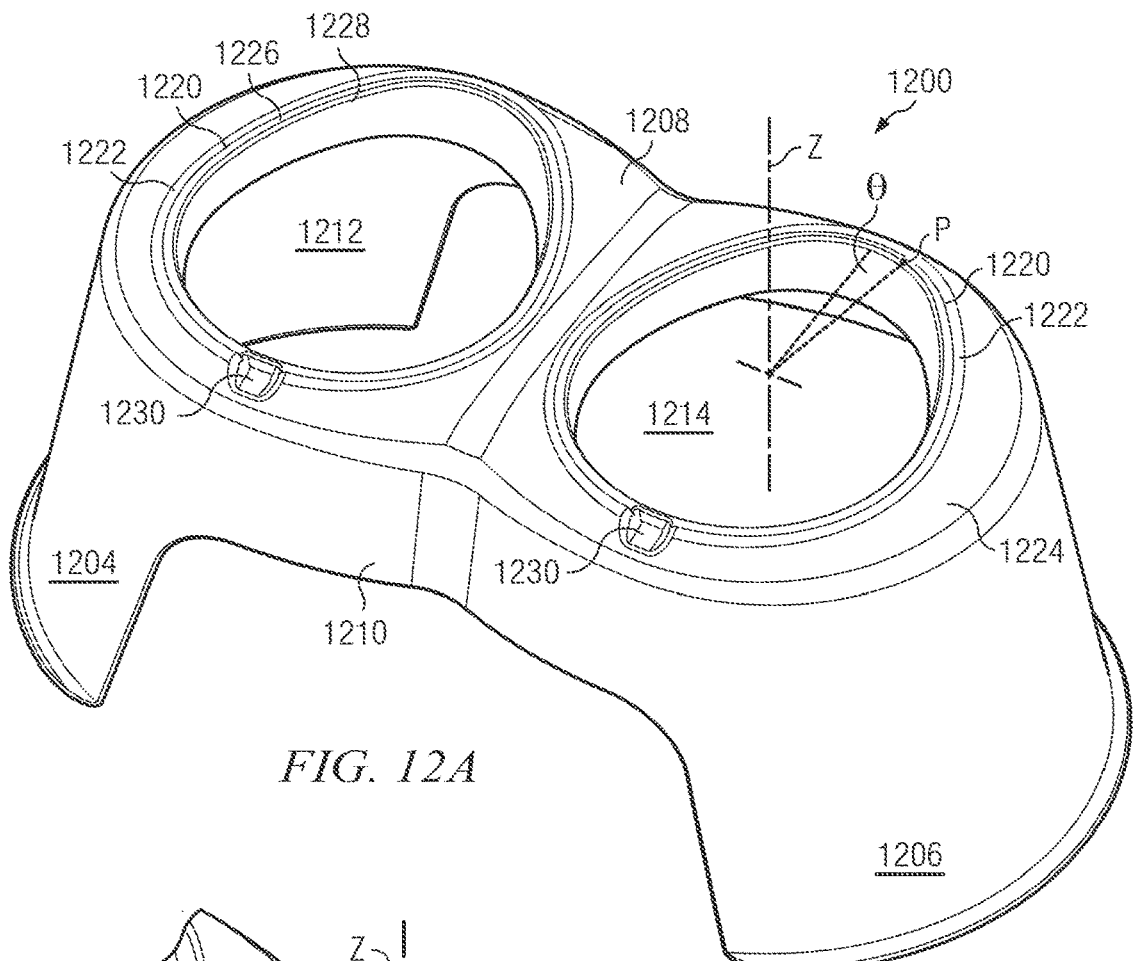
FIG. 12A is a top rear perspective view of a further embodiment of a stand for use in the pet feeding system of the invention.
Figure 12B:
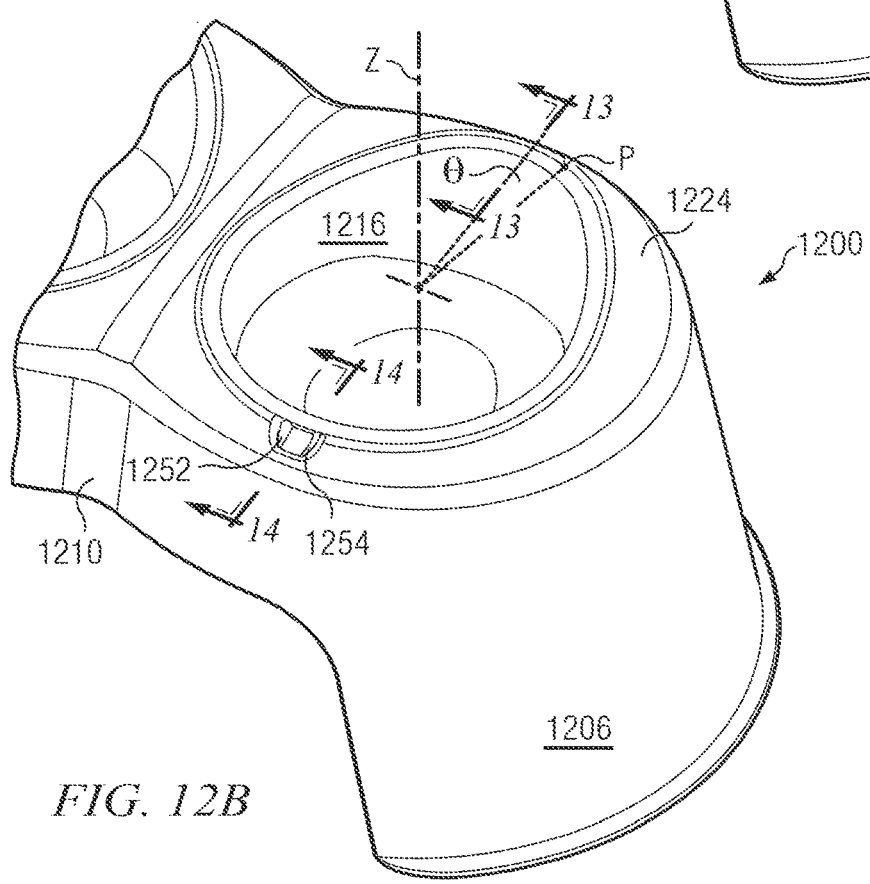
FIG. 12B is a fragmentary top rear perspective view of the stand shown in FIG. 12A, a further embodiment of a bowl being shown installed into a left bowl receptacle of the stand.
Figure 13:
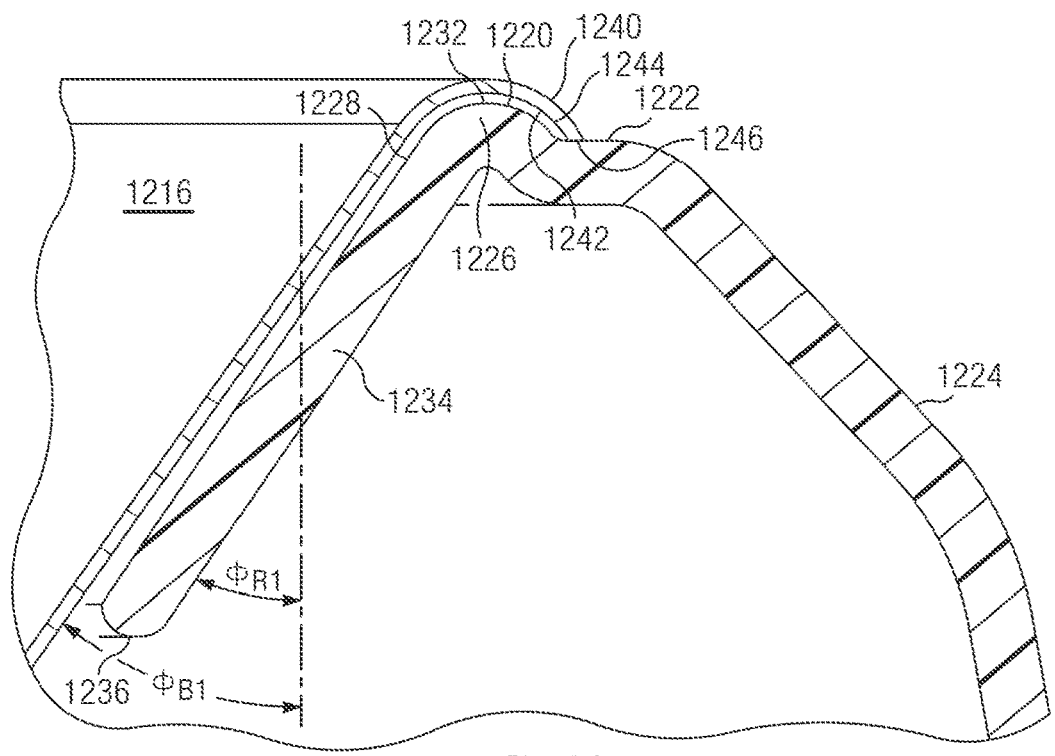
FIG. 13 is a longitudinal sectional detail taken substantially along line 13-13 of FIG. 12B.
Figure 14:
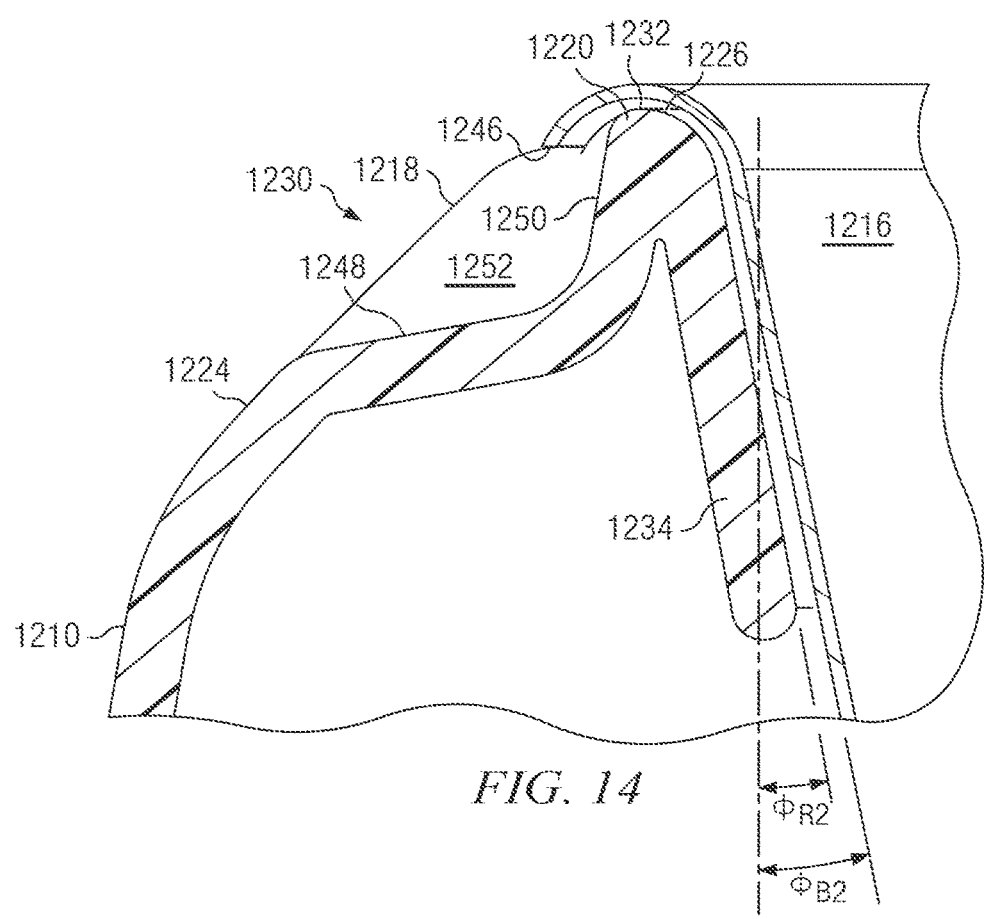
FIG. 14 is a longitudinal sectional detail taken substantially along line 14-14 of FIG. 12B.

FIGS. 12-14 depict a further embodiment of the invention incorporating certain improvements over the embodiments disclosed in FIGS. 1-11. A pet stand indicated generally at 1200 has a base 1202 that can be removably placed on a mat (not shown in FIGS. 12-14; any of the mats 108, 820, 1500 described herein will work with stand 1200). The stand 1200 may be made from the same materials as those recited for stand 106. Left and right sides 1204 and 1206 extend upwardly from the base 1202 to a stand top 1208. As in the last embodiment, the left and right stand sides 1204, 1206 each form convex surfaces and are joined together by a back 1210 and a similar front (not shown); in the illustrated embodiment, the sides, front and back are formed by a continuous sidewall. The back 1210 is meant to be positioned remotely or away from the pet 502, while the front is meant to be positioned to be proximate to the pet 502.

The stand top 1208 spans from the back 1210 to the front and from side 1204 to side 1206. Top 1208 has formed therein at least one, and in the illustrated embodiment two, bowl receptacles 1212 and 1214. As in the previously described embodiment the bowl receptacles preferably are oblong. Each bowl receptacle 1212, 1214 is adapted to receive a similarly oblong-shaped bowl 1216 (one shown). As measured in a horizontal plane at its upper periphery, a major axis of bowl 1216, in a front-to-back direction, is longer than a minor axis disposed in a side-to-side or transverse direction.

The stand top 1208 has a top surface 1218 that, in the illustrated embodiment, has first, second and third zones 1220, 1222 and 1224. A respective first zone 1220 and a respective second zone 1222 are provided for each bowl receptacle 1212, 1214. The first zone 1220 is disposed to be adjacent an upper periphery 1228 of bowl receptacle 1212 or 1214 and includes an upwardly convex ring 1226 that completely laterally surrounds bowl receptacle 1212 or 1214. Extending laterally outwardly (relative to vertical axis Z of the receptacle and bowl) from the first zone 1220 is the second zone 1222. The second zone 1222 of the top surface is either horizontal (perpendicular to axis Z) or is radially outwardly and downwardly sloped. In the illustrated embodiment, second zone 1222 is flat and horizontal.

The second zone 1222 completely laterally surrounds the first zone 1220 for any particular bowl receptacle 1212 or 1214, except where zone 1222 is interrupted by a finger notch 1230. The elevation of the top surface 1218 of stand top 1208 within second zone 1222 is less than an upper limit 1232 of the upwardly convex ring 1226.

Disposed radially outwardly from the second zones 1222 (there is one per bowl receptacle) is a single third zone 1224. The slope of third zone 1224 varies from point to point, but any point on it slopes radially outwardly and downwardly relative to the closest bowl/receptacle axis Z, so that food and water particles are easily shed off of zone 1224 and not retained. The third zone 1224 separates the second zones 1222 and completes the top surface 1218 of the stand top 1208. Stand sides 1206, 1208 and connecting back 1210 (and the opposed front) each make a preferably curved shoulder with a lower end of third zone 1224.

FIGS. 12B, 13 and 14 all show a bowl 1216 removably installed in the left bowl receptacle 1214 (the view of FIGS. 12A and 12B being from the rear). The right and left bowl receptacles 1212, 1214, and the bowls 1216 meant to be received into them, may be different from each other in size or detail but in the illustrated embodiment they are the same. Bowls 1216 may be manufactured from the same materials and in the way described for bowl 102. From the upper periphery 1228 of the bowl receptacle, and as extended from an inner wall of the convex ring 1226, a sloped bowl receptacle sidewall 1234 extends downwardly and radially inwardly to its lower and inner end 1236. In this embodiment, inner end 1236 is free, leaving an opening in the receptacle from the stand top 1208 to the mat. In other embodiments, receptacles 1212, 1214 may be closed concave shapes.

Relative to a vertical reference, and at any particular point P at a horizontal angular location θ as measured around receptacle and bowl axis Z, and in a given horizontal plane, the slope of sidewall 1234 will subtend an angle $\phi_R$. At this horizontal angular location and in the same horizontal plane, a sidewall 1238 of the bowl 1216 will subtend an angle $\phi_B$ relative to a vertical reference that is substantially similar to, but slightly gentler than, angle $\phi_R$ at that location. Said another way, the draft of the bowl sidewall 1238 is slightly more pronounced than a corresponding draft of the bowl receptacle sidewall 1234. The difference between $\phi_B$ and $\phi_R$ may be chosen to be in the range of ½ to 2 degrees and in one embodiment is about 1 degree.

As taken in any given horizontal plane, the slopes of bowl sidewall 1238 and bowl receptacle sidewall 1234 vary as a function of horizontal angle θ from the axis. FIG. 13 is a section taken where θ=0°, or at the front of the stand 1200, while FIG. 14 is a section taken where θ=180°, at the rear of the stand. As can be seen, $\phi_{B1}$, taken at the front of the bowl 1216, is much larger/more gentle than $\phi_{B2}$, taken at the rear of the bowl 1216; the bowl 1216 has a much shallower draft toward its front than its rear. The receptacle sidewall angles $\phi_{R1}$ and $\phi_{R2}$ vary in a conforming way so that they are substantially similar to, but slightly steeper than, the bowl angles taken at the same points. The gap between the bowl sidewall 1238 and the bowl receptacle sidewall 1234 increases with depth. In one embodiment, the gap is about 0.025 in. at the top of walls 1238, 1234, and is about 0.045 in. near wall end 1236.

A peripheral lip 1240 of the bowl 1216 has a lower surface 1242 that is finished in a downwardly concave ring 1244. A radius of the concave ring 1244 is chosen to be slightly larger than a radius of the upwardly convex ring 1226 of the stand top surface first zone 1220. In this way, the concave ring 1244 fits over and is slightly spaced from the convex ring 1226. An outer edge 1246 of peripheral lip 1240 preferably contacts or rests on a second zone 1222 throughout the entire circumferential length of second zone 1222, that is, throughout most of the circumference of the lip 1240. This supports the entire weight of bowl 1216. The nominal spacing (e.g., 0.020″) of the concave ring 1244 from the convex ring 1226 ensures that lip edge 1246 will contact second zone 1222, minimizing any gaps between them. As installed, the outer edge 1246 is lower than an upper limit 1232 of the convex ring 1226. The interaction of the lower surface of the downwardly concave ring 1244 with the upwardly convex ring 1226 aids in centering and seating the bowl, and makes harder the possible dislodgment of the bowl 1216 from the bowl receptacle 1212 or 1214 by the pet.

As best seen in FIG. 14, the finger notch 1230 interrupts and cuts through the second zone 1222 of top surface 1218 but not through the convex ring 1226. The finger notch 1230 has a slightly inwardly and upwardly sloped floor 1248 that inwardly extends from a point on the third zone 1224 to an inner notch wall 1250. Notch floor 1248 is lower in elevation than second zone 1222 of the top surface 1218; in one embodiment, it can be 0.32 inches deeper than second zone 1222 as measured at the inner wall 1250. The inner notch wall 1250 is angled steeply upward and joins the notch floor 1248 to the convex ring 1226, via appropriate curved transitions. Inner notch wall 1250 may be continuous with an outer wall of the convex ring 1226, as shown. The notch 1230 has a sharply upwardly sloped right side wall 1252 that joins a right end of the notch floor 1248 to the top surface 1218 of the stand top 1208. Notch 1230 is completed by a sharply upwardly sloped left side wall 1254 that joins a left end of the notch floor 1248 to the top surface 1218 of the stand top 1208.

The finger notch 1230 permits a pet owner to insert a second, third or fourth finger of the hand underneath edge 1246 of the bowl 1216, such that bowl lip 1244 may be grasped between the inserted finger and the thumb of the owner and the bowl 1216 lifted from the bowl receptacle 1212 or 1214. Finger notch 1230 is dimensioned so as to accomplish this purpose; the spacing between a top end of right sidewall 1252 from a top end of left sidewall 1254 may be about one inch. The floor and all walls of the finger notch 1230 are radially outwardly and downwardly sloped for drainage. Importantly, the notch 1230 does not open onto or continue into the interior of the bowl receptacle 1212 or 1214; the notch inner wall 1250 joins to the convex ring 1226 to provide a fluid-obstructing barrier all of the way around the periphery of the bowl receptacle 1212, 1214.

Figure 15:
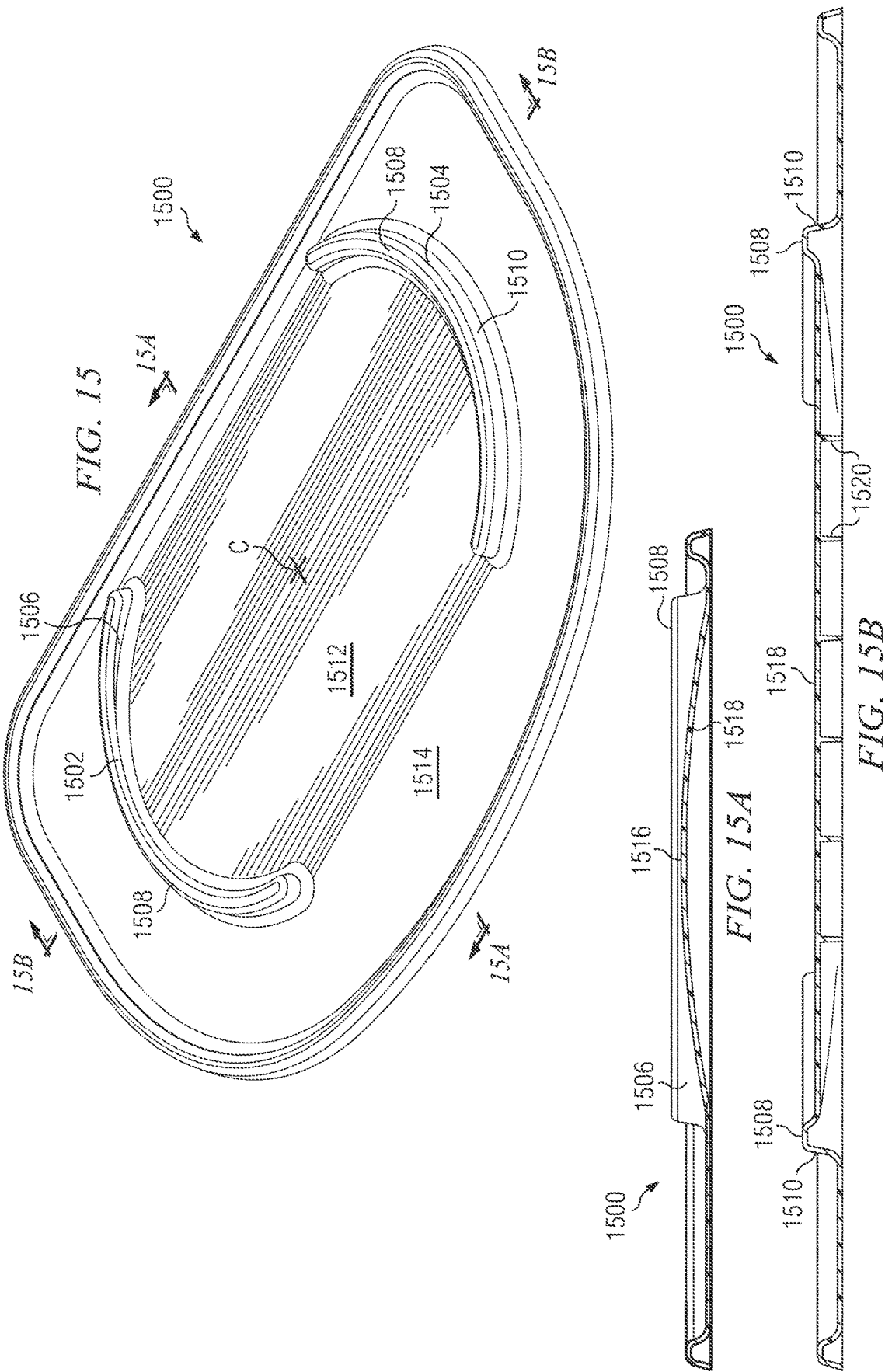
FIG. 15 is a top perspective view of a further embodiment of a mat for use with the invention.
Figure 16:
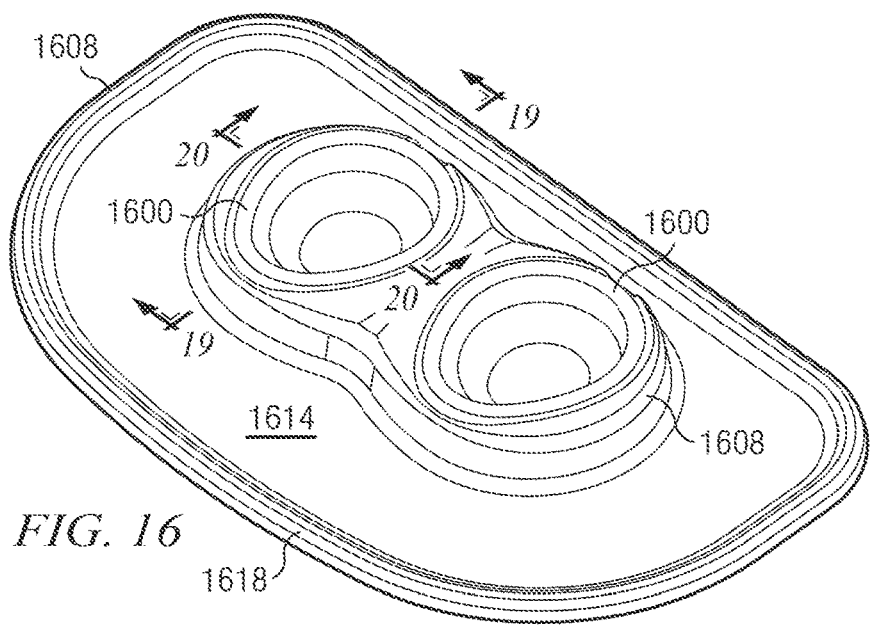
FIG. 16 is a top perspective view of a further pet feeding system according to the invention, showing two bowls installed in receptacles integrally formed in a mat.
Figure 17:
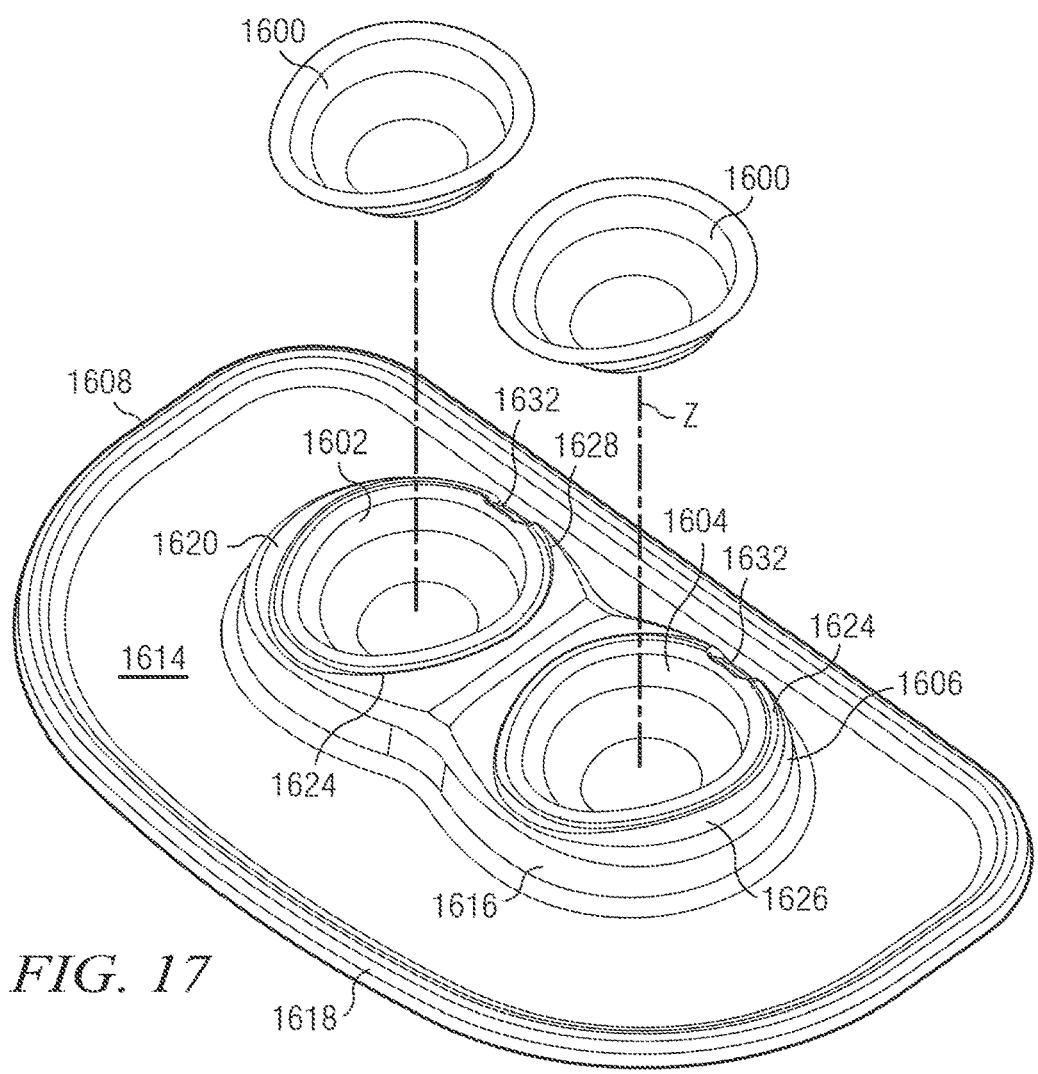
FIG. 17 is an exploded view of the pet feeding system shown in FIG. 16.

Referring now to FIGS. 15, 15A and 15B, a further embodiment of a mat 1500 for use with the invention is shown. The mat 1500 is similar to the mat 820 illustrated in FIGS. 8A and 8B, and the legs or sidewalls of the stand 106, 1200 fit to it in much the same way. Mat 1500 may be molded of the same materials as have been described for mat 108. As in mat 820, a pair of upstanding arcuate ribs 1502, 1504 have radii of arc that are significantly less than the distance of the inner wall 1506 of each rib 1502 to a center C of mat 1500. This intentional mismatch prevents the stand 106, 1200 from rotating relative to the mat 1500.

Each rib 1502, 1504 has a top surface 1508 and an outer wall 1510. Relative to the embodiment shown in FIGS. 8A and 8B, the outer wall 1510 of each rib 1502, 1504 has been upwardly extended to better engage an inner wall of a stand base or leg (not shown). As before, all of the area 1512 in between the ribs 1502, 1504 is vaulted in a front-to-back direction so that particles of food and water are shed to a peripheral area 1514 of the mat 1500. A highest point 1516 of the central area 1512 is now below the top surfaces 1508 of the ribs 1502, 1504.

The mat 1500 preferably is injection-molded and its various parts are formed by walls that at least roughly conform to a nominal thickness for ease in molding. In such an embodiment, ribs 1502, 1504 are hollow and a web 1518 of the central area 1512 is propped up into a vaulted condition by spaced-apart, downwardly extending ribs 1520. In the illustrated embodiment, the ribs 1520 are parallel to each other and run in a longitudinal or front-to-back direction.

A further embodiment of the invention is illustrated in FIGS. 16-20. In this embodiment, the stand is omitted and one or more bowls 1600 are received into respective bowl receptacles 1602, 1604 formed in a top surface of a central pier, mesa or eminence 1606 of a mat 1608. Preferably the bowls 1600 are generally similar to bowl 1216, and are made by of the same materials and in the same way as described for bowl 102. Each bowl 1600 is oblong: bowl 1600 has, as taken in a horizontal plane at its upper periphery, a major axis in a front-to-back direction that is longer than a minor axis thereof in a side-to-side direction. Bowls 1600 have a front wall draft that is gentler than the draft of the rear bowl wall, and are finished with a peripheral lip that has a lower surface that is a downwardly concave ring 1610 with an edge 1612. Mat 1608 may be injection-molded using a polymer compound described in conjunction with mat 108.

This embodiment is particularly suited to dogs with short legs, very small dogs and cats. For these pets, the bowls 1600 do not need to be elevated off of the peripheral top mat surface 1614 by more than the depth of the bowl receptacles 1602, 1604, and little more than the depth of the bowls 1600 themselves.

The central pier or mesa 1606 is integrally molded with the rest of the mat 1608. Pier 1606 is located so as to be spaced from any lateral edge 1618 of the mat 1608. Preferably, more of the peripheral top mat surface 1614 is disposed toward the front of the pier 1606 than is disposed to the rear of it. An upstanding wall 1616 of the pier 1606 upwardly extends from the general, peripheral mat surface 1614 and preferably is rounded or convexly curved as it transitions to a top surface 1620 of the pier 1606.

The top surface 1620 of the pier 1606 has a first zone 1622 that is immediately adjacent each bowl receptacle 1602, 1604, a respective second zone 1624 for each bowl receptacle that extends radially outwardly from the first zone 1622, and a third zone 1626 that laterally surrounds and spaces apart the second zones 1624. Each first zone includes an upwardly convex ring 1628 that completely surrounds a respective one of the bowl receptacles 1602, 1604. The second zone 1624 (one is accorded for each receptacle 1602, 1604) is either flat (as shown) or is downwardly and radially outwardly sloped relative to central vertical axis Z, and its elevation is less than an upper limit 1630 of the convex ring 1628. All points on the third zone 1626 are downwardly and outwardly sloped relative to the nearest bowl/receptacle axis Z, so that food and water particles will not accumulate on any part of third zone 1626 of the pier top surface 1618.

Each receptacle 1602, 1604 is provided with a finger notch 1632 that is similar in shape, position, dimensions and function to finger notches 1230 of the embodiment shown in FIGS. 12A-14. For each bowl receptacle 1602, 1604, a second zone 1624 completely laterally surrounds the receptacle 1602 or 1604, except where second zone 1624 is interrupted by a finger notch 1632. Notches 1632 preferably are located to the rear of respective bowl receptacles 1602, 1604. Each finger notch 1632 has a floor 1634 that slopes radially outwardly and downwardly until it transitions to third zone 1626 or, as shown, pier wall 1616. The floor 1634 is at an elevation that is lower than second zone 1624. Notch 1632 extends inwardly until it joins with a notch inner wall 1635. Notch inner wall 1635 extends upwardly and somewhat inwardly until it seamlessly meets an outer wall of convex ring 1628. In this way, the finger notch 1632 interrupts second zone 1624, but does not interrupt convex ring 1628, which therefore acts as a barrier to food and water particles. The notch 1632 is laterally bounded by a left wall 1638 that joins floor 1634 to the general top surface 1618 of the pier 1620, and a similar right wall (not shown in FIG. 19).

Preferably, and as shown in FIG. 20, each bowl 1600 is entirely supported by its edge 1612 resting on the second zone 1624 of the top surface 1618 of the pier 1606. The lower surface of downwardly concave ring 1610 fits over and is slightly spaced from the upwardly convex ring 1628, aiding in centering and seating bowl 1600 within receptacle 1602 or 1604 and also providing resistance to the bowl being dislodged out of the bowl receptacle 1602 or 1604 by the pet. The slight spacing ensures that edge 1612 will contact second zone 1624, minimizing gaps.

Unlike the embodiments including a mat, stand and bowls, each bowl receptacle 1602, 1604 is closed to prevent the spillage of food or water on the floor. Each receptacle 1602, 1604 has a lower surface 1640 that rests directly on the floor or other supporting surface, and is in the same plane as the lowest plane of the rest of the mat 1608. This provides support and structural stiffness. A draft of a bowl receptacle sidewall 1642 substantially matches the draft of a bowl sidewall 1644, and both of these drafts change in a uniform fashion, within a given horizontal plane, as a function of the lateral angle of the point being considered. As shown in FIGS. 19 and 20, a draft of the bowl receptacle wall 1642 and a draft of the bowl sidewall 1644, taken at its rear end as shown in FIG. 19, may be similar to a draft of the bowl receptacle sidewall 1642 and the bowl sidewall 1644 taken at a side of the bowl. But a draft of both the bowl receptacle sidewall 1642 and the bowl sidewall 1644 will be considerably gentler at the front of the bowl, similar to what is shown in FIGS. 13 and 14. A gap or clearance, which may be on the order of 0.020 in., is maintained between the outer surface of bowl 1600 and the upper surface of receptacle sidewall 1642 at all points, so that bowl edge 1612 will contact second zone 1624 and support the entire weight of the bowl and its contents.

In summary, an improved pet feeding station incorporates bowls with forwardly extending portions and gradual drafts to easily accommodate the heads of feeding pets. A top surface of the stand is crowned to shed stray food particles and water. A mat of the system has structure that locates the stand and holds it in place against lateral shear and torsional forces. Convex rings surrounding bowl receptacles of the stand allow for easier indexing and location of the bowls to the stand and make harder the dislodgement of the bowls from the stand by the pet. A finger notch is provided adjacent each bowl receptacle so that a user may more easily remove the bowl from the stand for filling or cleaning.

While illustrated embodiments of the present invention have been described and illustrated in the appended drawings, the present invention is not limited thereto but only by the scope and spirit of the appended claims.

We claim:

1. A pet feeding system disposed on a vertical axis, the system comprising:
a stand having a front displaced from the vertical axis in an x direction orthogonal to the vertical axis, a back opposed to the front, first and second sides joining the front to the back, the first side displaced from the vertical axis in a y direction orthogonal to the x direction and to the vertical axis, the second side displaced from the vertical axis in a −y direction opposite from the y direction, and a top connecting the front, back and first and second sides, the top defining at least one noncircular bowl opening, a front-to-back diameter of the at least one noncircular bowl opening parallel to the x direction being greater than a side-to side diameter of the at least one noncircular bowl opening parallel to the y direction, at least one wall of the stand extending downwardly from the top and terminating in at least one stand base, the at least one wall including a first concavely curved interior surface and a second concavely curved interior surface displaced in the −y direction from the first concavely curved interior surface, the first and second concavely curved interior surfaces being concave relative to the vertical axis;
at least one noncircular bowl removably received in said at least one noncircular bowl opening and disposed on a bowl axis parallel to the vertical axis, the at least one noncircular bowl having an upper edge, a radius in the x direction from the bowl axis to the upper edge of the at least one noncircular bowl being greater than a radius in the y direction from the bowl axis to the upper edge of the at least one noncircular bowl, such that the at least one noncircular bowl is lobed in the x direction, the at least one noncircular bowl opening preventing rotation of the at least one noncircular bowl around the bowl axis relative to the stand; and
a mat having a general upper surface for receiving the at least one stand base and having a mat center disposed on the vertical axis, a total area of the mat as measured in a horizontal plane being greater than a total area of the at least one stand base as measured in the horizontal plane, the stand removably positioned on the mat on a vertical axis, a first raised arcuate rib of the mat upwardly extending from the general surface of the mat and to be displaced from the vertical axis in the y direction, a second raised arcuate rib of the mat upwardly extending from the general surface of the mat and to be displaced from the vertical axis in the −y direction, a laterally exterior convex surface of the first arcuate rib fitting to the first concavely curved interior surface of the base, a laterally exterior convex surface of the second arcuate rib fitting to the second concavely curved surface of the base, the laterally exterior convex surfaces of the first and second arcuate ribs each having a radius of curvature that is less than a distance of the laterally exterior convex surfaces to the center of the mat, the first and second arcuate ribs of the mat cooperating with respective ones of first and second concavely curved interior surfaces of the base to prevent lateral displacement in any lateral direction of the stand relative to the mat and preventing rotation of the stand around the vertical axis, the first and second arcuate ribs being disposed radially interiorly of said at least one stand base, the stand base including a foot flange that extends laterally outwardly relative to the vertical axis from the at least one wall of the stand;
wherein the stand elevates the at least one bowl above the mat.

2. A pet feeding system disposed on a vertical axis, the system comprising:
a stand having a front displaced from the vertical axis in an x direction orthogonal to the vertical axis, a back opposed to the front, a first side of the stand displaced from the vertical axis in a y direction orthogonal to the vertical axis and to the x direction, a second side of the stand displaced from the vertical axis in a −y direction opposite from the y direction, the first and second sides joining the front to the back, and a top connecting the front, back and first and second sides, the top defining at least one noncircular bowl opening, a first side wall forming the first side of the stand and downwardly extending to terminate in a first stand foot, a second side wall displaced from the first side wall in the −y direction and downwardly extending to terminate in a second stand foot, each of the first and second side walls having an interior surface, the interior surfaces of the first and second side walls facing each other and facing the vertical axis;
at least one noncircular bowl removably received in the at least one noncircular bowl opening, the noncircular bowl opening preventing rotation of the at least one noncircular bowl around the vertical axis relative to the stand; and
a mat having a general upper surface for receiving the first and second stand feet and having a mat center disposed on the vertical axis, a total area of the mat as measured in a horizontal plane being greater than an area in the horizontal plane taken up by and located between the first and second stand feet, the stand removably positioned on the mat to be disposed on the vertical axis, a first rib of the mat upwardly extending from the general surface of the mat and to be displaced from the vertical axis in the y direction, a second rib of the mat upwardly extending from the general surface of the mat and to be displaced from the vertical axis in the −y direction, a laterally exterior surface of the first rib fitting to the interior surface of the first side wall of the stand, a laterally exterior surface of the second rib fitting to the interior surface of the second side wall of the stand, the first and second ribs cooperating with respective ones of the interior surfaces of the first and second side walls to prevent lateral displacement of the stand relative to the mat and to prevent rotation of the stand around the vertical axis relative to the mat, wherein the first and second ribs are spaced apart from each other in a transverse direction parallel to the y direction and are concavely arcuate relative to the vertical axis; and a top surface of the mat extending between the first and second ribs being convexly vaulted in only a front-to-rear direction parallel to the x direction.

3. A pet feeding system disposed on a vertical axis, the pet feeding system comprising:

a stand having a front displaced from the vertical axis in an x direction orthogonal to the vertical axis, a back opposed to the front, first and second sides joining the front to the back, the first side displaced from the vertical axis in a y direction orthogonal to the x direction and to the vertical axis, the second side displaced from the vertical axis in a -y direction opposite from the y direction, and a top connecting the front, back and first and second sides, the top defining at least one noncircular bowl opening, a front-to-back diameter of the at least one noncircular bowl opening parallel to the x direction being greater than a side-to-side diameter of the at least one noncircular bowl opening parallel to the y direction, a first side wall forming the first side of the stand and downwardly extending to terminate in a first stand foot, a second side wall transversely displaced from the first side wall and downwardly extending to terminate in a second stand foot, each of the first and second side walls having a concavely curved interior surface, the interior surfaces of the first and second side walls facing each other and being concave relative to the vertical axis;

at least one noncircular bowl removably received in the at least one noncircular bowl opening and positioned on a bowl axis parallel to the vertical axis, the at least one noncircular bowl having an upper edge, a radius in the x direction from the bowl axis to the upper edge of the at least one noncircular bowl being greater than a radius in the y direction from the bowl axis to the upper edge of the at least one noncircular bowl, such that the at least one noncircular bowl is lobed in the x direction, the at least one noncircular bowl opening preventing rotation of the at least one noncircular bowl around the bowl axis relative to the stand; and a mat having a general upper surface for receiving the first and second stand feet and having a mat center disposed on the vertical axis, a total area of the mat as measured in a horizontal plane being greater than an area in the horizontal plane taken up by and located between the first and second stand feet, the stand removably positioned on the mat to be disposed on the vertical axis, a first raised arcuate rib of the mat upwardly extending from the general upper surface of the mat and to be displaced from the vertical axis in the y direction, a second raised arcuate rib of the mat upwardly extending from the general surface of the mat and to be displaced from the vertical axis in the -y direction, a laterally exterior convex surface of the first arcuate rib fitting to the concavely curved interior surface of the first side wall, a laterally exterior convex surface of the second arcuate rib fitting to the concavely curved interior surface of the second side wall, the laterally exterior convex surfaces of the first and second ribs each having a radius of curvature that is less than a distance of the laterally exterior convex surfaces to the center of the mat, the first and second raised arcuate ribs of the mat cooperating with respective ones of the concavely curved interior surfaces of the first and second side walls to prevent lateral displacement of the stand relative to the mat and to prevent rotation of the stand around the vertical axis relative to the mat;

wherein the stand elevates the at least one bowl above the mat.

4. The system of claim 3, wherein the lateral exterior convex surfaces of the first and second arcuate ribs are upwardly and inwardly sloped relative to the vertical-axis.

5. The system of claim 3, wherein the first and second arcuate ribs are hollow.

\* \* \* \* \*